(12) United States Patent
Sankaran et al.

(10) Patent No.: US 10,048,881 B2
(45) Date of Patent: Aug. 14, 2018

(54) RESTRICTED ADDRESS TRANSLATION TO PROTECT AGAINST DEVICE-TLB VULNERABILITIES

(71) Applicant: INTEL CORPORATION, Santa Clara, CA (US)

(72) Inventors: Rajesh M. Sankaran, Portland, OR (US); Prashant Sethi, Folsom, CA (US); Asit K. Mallick, Saratoga, CA (US); David Woodhouse, Braintree (GB); Rupin H. Vakharwala, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 15/207,218

(22) Filed: Jul. 11, 2016

(65) Prior Publication Data

US 2018/0011651 A1    Jan. 11, 2018

(51) Int. Cl.
*G06F 3/06* (2006.01)
*G06F 12/1009* (2016.01)
(Continued)

(52) U.S. Cl.
CPC ............ *G06F 3/0622* (2013.01); *G06F 3/064* (2013.01); *G06F 3/0637* (2013.01); *G06F 3/0664* (2013.01); *G06F 3/0665* (2013.01); *G06F 3/0673* (2013.01); *G06F 12/1009* (2013.01); *G06F 12/1081* (2013.01);
(Continued)

(58) Field of Classification Search
CPC ........................ G06F 12/1009; G06F 12/1081
See application file for complete search history.

(56) References Cited

U.S. PATENT DOCUMENTS

| 7,340,582 B2 | 3/2008 | Madukkarumukumana et al. |
| 8,850,098 B2 | 9/2014 | Madukkarumakumana et al. |

(Continued)

FOREIGN PATENT DOCUMENTS

| KR | 10-1575827 B1 | 12/2015 |
| WO | 2006039051 A1 | 4/2006 |

(Continued)

OTHER PUBLICATIONS

International Search Report and Written Opinion for PCt/US2017/036877, 14 pages, dated Sep. 14, 2017.

(Continued)

*Primary Examiner* — Edward J Dudek, Jr.
(74) *Attorney, Agent, or Firm* — Lowenstein Sandler LLP

(57) ABSTRACT

An apparatus includes an extended capability register and an input/output (I/O) memory management circuitry. The I/O memory management circuitry is to receive, from an I/O device, an address translation request referencing a guest virtual address associated with a guest virtual address space of a virtual machine. The I/O memory management circuitry may translate the guest virtual address to a guest physical address associated with a guest physical address space of the virtual machine, and, responsive to determining that a value stored by the extended capability register indicates a restrict-translation-request-response (RTRR) mode, transmit, to the I/O device, a translation response having the guest physical address.

23 Claims, 16 Drawing Sheets

(51) Int. Cl.
 *G06F 12/1081* (2016.01)
 *G06F 12/14* (2006.01)
(52) U.S. Cl.
 CPC .... *G06F 12/145* (2013.01); *G06F 2212/1052* (2013.01); *G06F 2212/151* (2013.01); *G06F 2212/152* (2013.01); *G06F 2212/651* (2013.01); *G06F 2212/656* (2013.01); *G06F 2212/657* (2013.01)

(56) References Cited

U.S. PATENT DOCUMENTS

| | | | |
|---|---|---|---|
| 2005/0132365 | A1 | 6/2005 | Madukkarumukumana et al. |
| 2011/0023027 | A1* | 1/2011 | Kegel ................ G06F 12/10 718/1 |
| 2015/0089116 | A1 | 3/2015 | Chin et al. |
| 2015/0089150 | A1 | 3/2015 | Kessler et al. |
| 2015/0199280 | A1 | 7/2015 | Molnar et al. |
| 2016/0259735 | A1* | 9/2016 | Evans ............... G06F 12/1036 |

FOREIGN PATENT DOCUMENTS

| | | |
|---|---|---|
| WO | 2006039057 A2 | 4/2006 |
| WO | 2006039057 A3 | 4/2006 |
| WO | 2006039643 A1 | 4/2006 |

OTHER PUBLICATIONS

"Intel® Virtualization Technology for Directed I/O," Architecture Specification, Rev. 2.3, Oct. 2014 (272 pages).
"Address Translation Services Revision 1.1," PCI-SIG, Jan. 26, 2009 (54 pages).

\* cited by examiner

FIG. 7

RESTRICTED ADDRESS TRANSLATION TO PROTECT AGAINST DEVICE-TLB VULNERABILITIES

BACKGROUND

Emerging accelerator and high-performance input/output (I/O) devices support shared virtual memory (SVM) that enables the I/O devices to operate in the same virtual memory address space as the application running on the host central processing unit (CPU) that submitted work to an accelerator. To do so, the I/O devices operate without need of pinning pages in memory, and instead, detect and handle I/O page faults just like CPU page-faults on virtual address translations. A page fault is a type of interrupt raised by computer hardware (in this case, the I/O device) when an application accesses a memory page that is mapped into a virtual address space, but not actually loaded in main memory.

BRIEF DESCRIPTION OF THE DRAWINGS

FIG. 7 is a table that illustrates second-level paging entries that support a second level of address translation performed by an IOMMU, according to an embodiment of the present disclosure.

DESCRIPTION OF EMBODIMENTS

Figure 1:
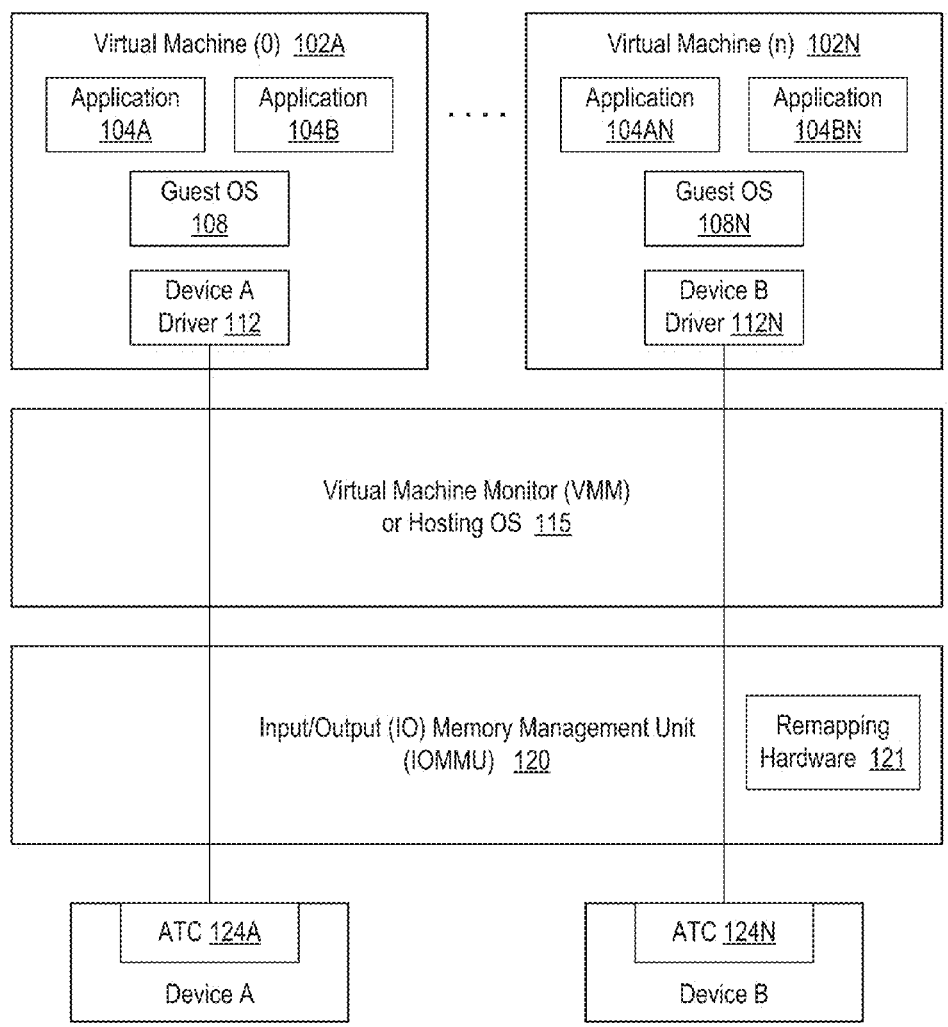
FIG. 1 is a block diagram of a system that provides hardware support for direct assignment of I/O devices, according to an embodiment of the present disclosure.

For I/O devices and controllers attached to I/O fabrics (such as Peripheral Component Interconnect (PCI)-Express (PCIe®) or on-chip or on-package variants of PCIe®) that supports a split-transaction protocol, I/O page-faults are detected at the source (e.g., the I/O device) before the transaction is submitted to the I/O fabric. A page fault is a type of interrupt raised by computer hardware (in this case, the I/O device) when an application accesses a memory page that is mapped into a virtual address space, but not actually loaded in the main memory.

One way to achieve I/O page fault detection at the I/O device is to build an address translation cache (ATC), also referred to as a device translation lookaside buffer (device-TLB), at the I/O device that is capable of caching virtual address translations along with permissions and interacting with an I/O memory management unit (IOMMU) in completing address translation requests. The IOMMU (also referred to as I/O memory management circuitry) is a direct memory access (DMA) remapping hardware unit that accesses translation tables populated by a virtual machine monitor (VMM) of a virtual machine for purposes of translating addresses of shared virtual memory (SVM) for I/O devices. As will be explained in detail, the translation requests sent to the IOMMU and the translation responses received back from the IOMMU allow the I/O devices to handle ATC misses, detect I/O page faults at the ATC, and report the page faults to software through the IOMMU before the transaction is issued on the I/O fabric. This software may be system software, which may include an operating system in a non-virtualized machine, or a VMM and/or OS running within a virtual machine.

In one embodiment, an I/O device sends a virtual address to the IOMMU in a translation request. The IOMMU may first translate the virtual address, which references a guest virtual address space, to a guest physical address (GPA) associated with a guest physical address space. The IOMMU may next translate the GPA to a host physical address (HPA) of main memory. The HPA is also referred to as a machine physical address. The IOMMU may send a translation response back to the I/O device with either a successful translation and the HPA, or a fault where translation was unsuccessful.

More specifically, address translation requests are handled by the IOMMU by looking up translated addresses within an I/O translation lookaside buffer (IOTLB) in the IOMMU or by performing page-walks of second-level paging structures (e.g., when performing nested translation) used to translate a virtual address to guest physical address (GPA) and to translate the GPA to a host physical address (HPA). The IOMMU may transmit the translated HPA to the I/O device, and the I/O device stores the HPA in an ATC of the I/O device. Upon an ATC hit of the HPA at the I/O device, the translated address from the ATC may be used to generate a translated request sent to the IOMMU. A translated request is a DMA request containing an HPA for direct access to data stored at the HPA in a page of memory. This type of translated request may bypass the address translation processing by the IOMMU because the translated request contains the host physical address. The IOMMU may then directly access and return, to the I/O device, the data in the memory page corresponding to the HPA provided in the translated request.

While the above-described process works to support shared virtual memory (SVM) and I/O page-fault capabilities, this approach exposes a significant vulnerability because the HPAs are cached in the device ATCs and the translated requests with these HPAs are allowed to bypass the IOMMU address translation. Accordingly, if an I/O device is compromised in allowing malicious software to modify the ATC contents, the I/O device can generate DMA requests with an HPA to any memory page in a platform that employs virtualization, including to other domains (applications, virtual machines or containers), or to virtual machine manager (VMM) code and to data pages in memory. A domain is an isolated environment in a platform to which a subset of host physical memory is allocated.

In one embodiment, the IOMMU can, instead of transmitting the HPA to the I/O device in a translation response to be cached in the I/O device's ATC, transmit the GPA generated during translation to be cached. The I/O device may then, instead of sending the HPA in the translated request to the IOMMU, send the GPA in the translated request. In response to the translated request, the IOMMU may perform additional translation on the GPA to complete the GPA-to-HPA translation as a form of protection against a malicious address in the translated request, for example. Upon successful GPA-to-HPA translation, the IOMMU may send data at the page in memory corresponding to the translated HPA to the I/O device.

This alteration in sending the GPA (instead of the HPA) in the translation response to the I/O device may be triggered after the IOMMU detects a restrict-translation-request-response (RTRR) (or similar) mode set by the IOMMU within an extended capability register of the IOMMU for one of the I/O devices or the guest virtual physical address space. Extended capability registers, as will be explained in detail, are used in various types of translations, to signal to software, remapping features to be used during address translation.

Because GPAs are now being cached in I/O device ATCs, the VMM of a virtual machine may include support for paging out memory pages identified with GPAs (in addition to the support already existing for paging out memory pages identified with HPAs) in response to page faults due to over commitment to memory. A page fault is a type of interrupt raised by computer hardware (in this case, the I/O device) when an application accesses a memory page that is mapped into a virtual address space, but not actually loaded in the main memory. This paging support, as will be explained in detail, is performed in a way that avoids non-recoverable faults due to a currently-pending (or later issued) translation request having a guest virtual address that maps to a GPA of a page that is being (or has been) paged out of memory.

FIG. 1 is a block diagram of a system 100 that provides hardware support for direct assignment of I/O devices, according to an embodiment of the present disclosure. The system 100 may include various virtual machines (VMs), for example a first VM 102A and a second VM 102N. The first VM 102A may include one or more applications 104A and 104B running on a guest operating system (OS) 108, and a Device A driver 112. The second VM 102N may similarly include one or more applications 104AN and 104BN running on a guest OS 108N, and a Device B driver 112N.

The system 100 may also include a virtual machine monitor (VMM) 115, e.g., a hosting OS for the system 100, an IOMMU 120 having DMA remapping hardware 121, and a number of I/O devices including Device A and Device B, which include an address translation cache (ATC) 124A and 124B, respectively. The Device A driver 112 may belong to Device A and the Device B driver 112N may belong to Device B.

Illustrated in FIG. 1 are a direct assignment of Device A to a first partition and a direct assignment of Device B to a second, different hardware partition. With the approach of directly assigning the I/O Devices A and B to separate partitions, the driver for an assigned I/O device runs only in the partition to which its corresponding device is assigned, and is allowed to interact directly with the device hardware with minimal or no VMM involvement. The DMA remapping hardware 121 within the IOMMU enables this direct device assignment without device-specific knowledge in the VMM 115.

Accordingly, the VMM 115 may restrict itself to enabling direct assignment of I/O devices to their respective partitions. Rather than invoking the VMM for all I/O requests from a partition, the VMM may be invoked only when guest software accesses protected resources (such as configuration accesses, interrupt management, and the like) that impact system functionality and isolation. To support direct assignment of I/O devices, the VMM 115 enforces isolation of DMA requests. The I/O devices Device A and Device B can be assigned to domains, and the remapping hardware 121 of the IOMMU 120 can be used to restrict direct memory access from an I/O device to the physical memory presently owned by its domain. For domains that may be relocated in physical memory, the remapping hardware 121 can be programmed to perform the necessary translation. This I/O device assignment allows other I/O sharing usages, for example, assigning an I/O device to an I/O partition that provides I/O services to other user partitions. The remapping hardware 121 enables virtualization software to choose the correct combination of device assignment and software-based methods for I/O virtualization.

The OS 102A or 102N may use this DMA remapping hardware 121 of the IOMMU 120 in a number of ways, such as, for example, for OS protection, feature support in dealing with legacy devices, and to provide DMA isolation. Furthermore, the OS 102A or 102N may use the DMA remapping hardware to provide for shared virtual memory. For devices supporting split-protocol capabilities such as PCIe®, for example, the OS may use the DMA remapping hardware capabilities to share virtual address space of application processes with I/O devices. Shared virtual memory along with support for I/O page fault enable application programs to freely pass arbitrary data structures to devices such as graphics processors or accelerators, without the overheads of pining and marshalling of data.

To support such usages, the VMM 115 may virtualize the remapping hardware 121 to its guests, e.g., the VM 102A through VM 102N. For example, the VMM 115 may intercept guest accesses to the virtual remapping hardware registers of the IOMMU 120, and manage a shadow copy of the guest remapping structures that is provided to the physical remapping hardware 121. On updates to the guest I/O page tables, the guest software performs virtual invalidation operations to update shadow remapping structures such as shadow page tables (which are copies of the VMM's page tables maintained by a guest operating system). The virtual invalidation requests may be intercepted by the VMM 115 to update the respective shadow page tables and perform invalidations of remapping hardware of the IOMMU 120. Due to the non-restartability of faulting DMA transactions (unlike CPU memory management virtualization), the VMM 115 software cannot perform untimely updates to its shadow remapping structures. To keep the shadow remapping structures consistent with the guest structures, the VMM 115 may expose virtual remapping hardware with pre-fetching behavior (including caching of not-present entries) or use processor memory management mechanisms to write-protect the guest remapping structures.

On hardware implementations supporting two levels of address translations (first-level translation to remap a guest virtual address to an intermediate, guest physical address (GPA), and second-level translations to remap the intermediate, guest physical address (GPA) to machine or host physical address (HPA)), the VMM 115 may virtualize guest OS use of first-level translations (such as for SVM usages) without shadowing page-tables, but by configuring hardware to perform nested translation of first and second-levels. Performance of nested translations will be discussed in more detail.

Figure 2:
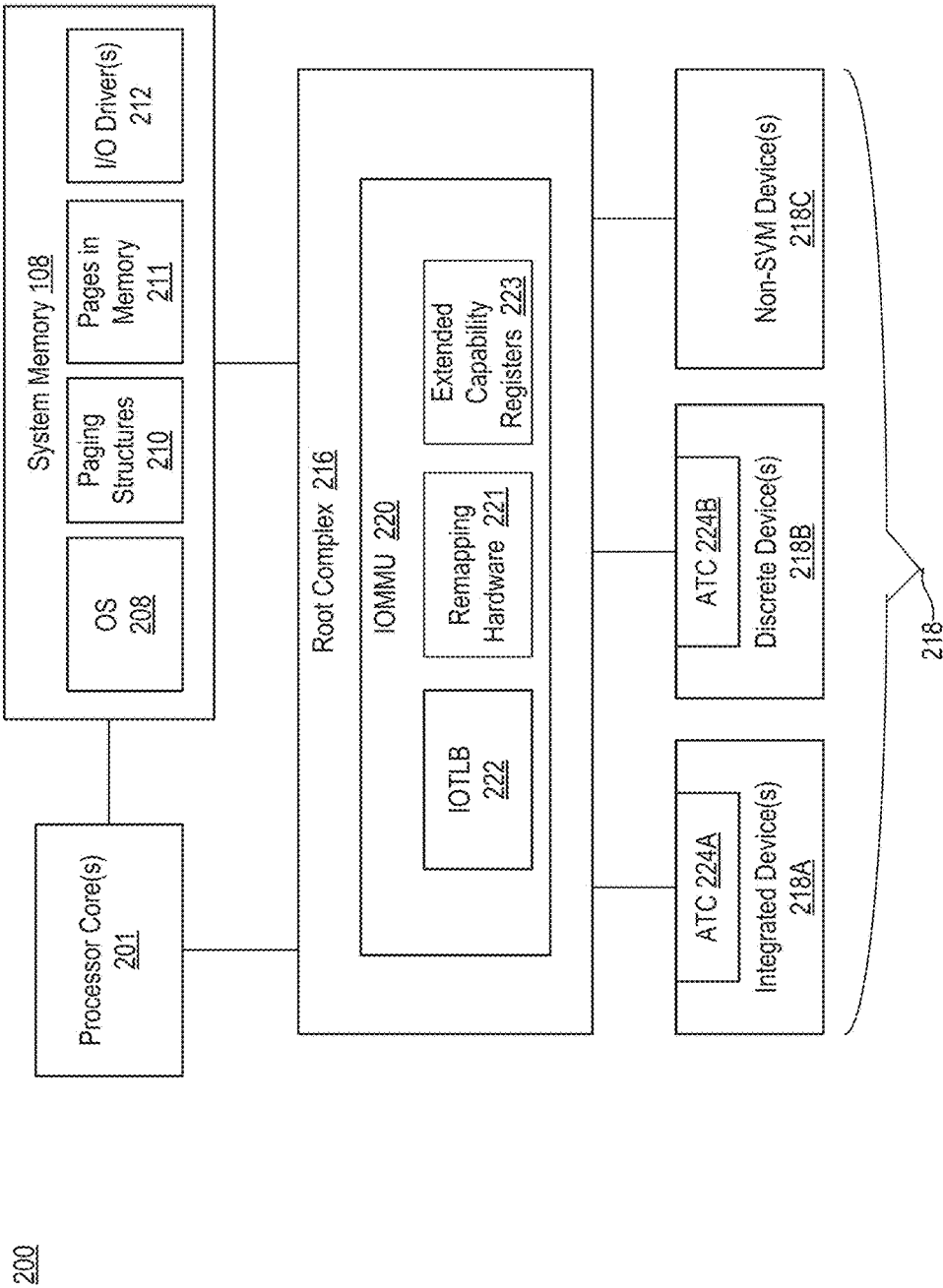
FIG. 2 is a block diagram of I/O virtualization management system including an I/O memory management unit (IOMMU) capable of restricting translation request responses, according to an embodiment of the present disclosure.

FIG. 2 is a block diagram of I/O virtualization management system 200 including an I/O Memory Management Unit (IOMMU) capable of restricting translation request responses, according to an embodiment of the present disclosure. The system 200 may include, among other components, one or more processor cores 201 each that may execute the one or more virtual machines 102A through 102N of FIG. 1. The system 200 may also include a system memory 108 to store an operating system (OS), paging structures 210, data pages 211, and I/O driver(s) 212, among other data and data structures.

The system 200 may further include a Root-Complex (RC) 216 (also referred to as the memory controller hub) coupled between the processor cores 201 and system memory 108 and a plurality of I/O devices 218 (which may also be any endpoint device, including a device, a bus, or other endpoint hardware). The Root-Complex 216 may be integrated into a chipset that integrates multiple functionalities such as an ability to execute in isolated execution mode, a host-to-peripheral bus interface, and memory control.

In one embodiment, the I/O devices 218 include one or more integrated devices 218A (such as processor graphics), one or more discrete devices 218B (such as PCIe® devices or other attached devices), and/or one or more non-SVM devices 218C (such as legacy devices that do not support shared virtual memory). The I/O devices, furthermore, may include network controller devices, storage controller devices, peripheral controller devices (like Universal Serial Bus (USB) controllers), media controller devices, display controllers, and the like. Each of the integrated devices 218A and the discrete devices 218B may contain an address translation cache (ATC) 224A or 224B, respectively.

The Root-Complex 216 may also include an IOMMU 220 (such as the IOMMU 120 of FIG. 1). The IOMMU 220 may further include remapping hardware 221 that is configured to facilitate I/O virtualization address translation of I/O transactions, an I/O translation lookaside buffer (IOTLB) 222, in which to cache I/O transactions and corresponding data, and extended capability registers 223 used to report to software enablement of various remapping features.

The DMA remapping architecture described with reference to FIG. 1 supports address translation of DMA requests received by the Root-Complex 216 from the I/O devices 218. Hardware in the IOMMU 220 may accelerate the address-translation process by caching data from various translation structures that will be discussed in more detail. The IOTLB 222 may be coupled to the remapping hardware 221. The translation caches of the IOTLB 222 are a finite resource that supports requests from multiple I/O devices. As a result, efficiency of these translation caches in the system 200 platform may depend on a number of simultaneously active DMA streams in the platform, and address locality of DMA accesses by the I/O devices, for example.

One approach to scaling translation caches is to enable the I/O devices 218A and 218B to participate in the remapping process with address translation caches implemented at the devices, e.g., the ATC 224A and ATC 224B (which are also referred to as Device-TLBs in the art). The ATCs alleviate pressure on the IOTLB 222 of the Root-Complex 216, and provide opportunities for devices to improve performance by pre-fetching address translations before issuing DMA requests. The ATCs 224A and 224B can be particularly useful for devices with strict access latency requirements (such as isochronous devices), and for devices that have large DMA working set or multiple active DMA streams. The remapping hardware 221 may report support for ATCs through an extended capability register 223. Additionally, as mentioned, the ATCs 224A and 224B may be utilized by I/O devices to support recoverable I/O page faults.

Employing the ATCs in various I/O devices 218 involves a standardized mechanism for various functions, such as, for example, to request and receive translations from the IOMMU 220 of the Root-Complex 216, to indicate if a memory request has a translated or an un-translated address, and to invalidate translations cached at the ATCs 224A and 224B, all of which will be discussed in more detail with reference to FIG. 3.

Figure 3:
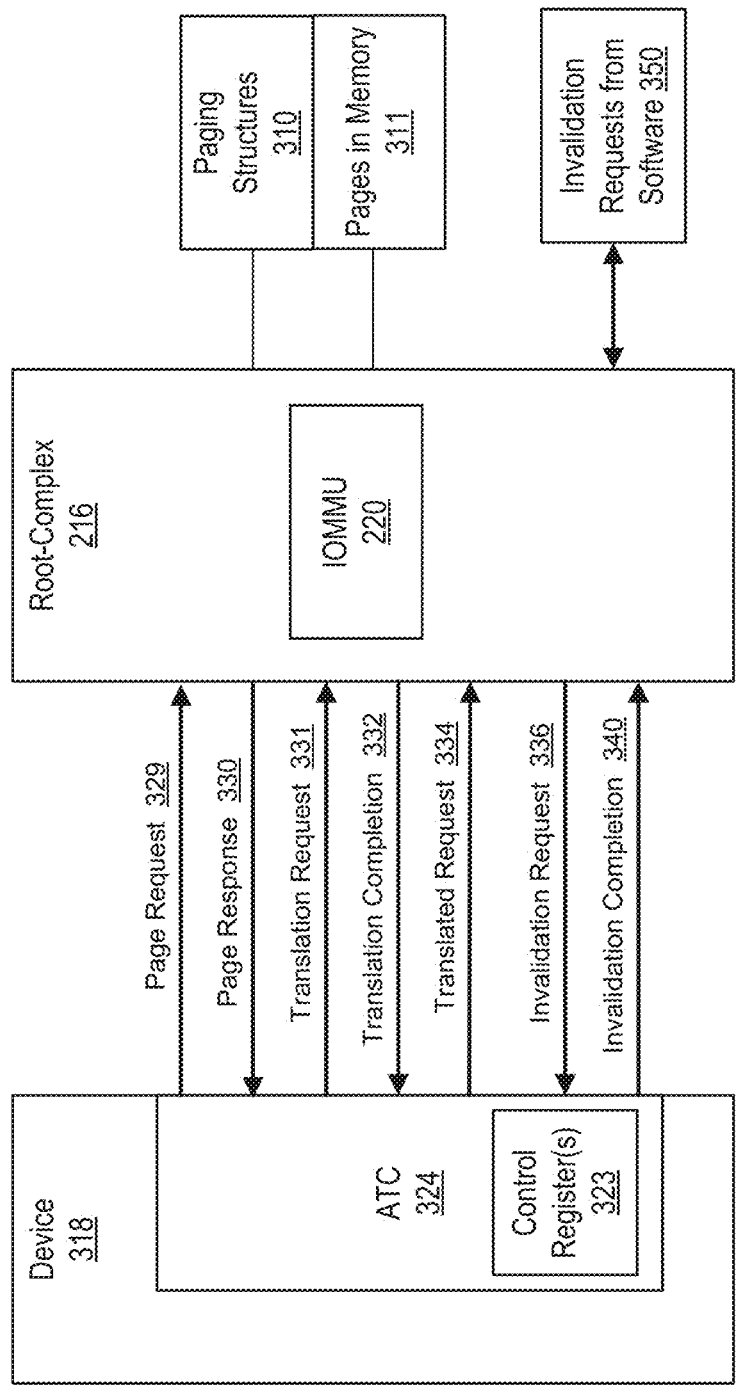
FIG. 3 is a block diagram of an I/O device having an address translation cache (ATC) in which the IOMMU of FIG. 2 provides virtualization technology for directed I/O of the I/O device, according to an embodiment of the present disclosure.

FIG. 3 is a block diagram of an I/O device 318 having an address translation cache (ATC) 324 in which the IOMMU 220 of FIG. 2 provides virtualization technology for directed I/O of the I/O device 318, according to an embodiment of the present disclosure. The ATC 324 may further include control registers 323 to enable capabilities and ATC behavior such as address translation services and page request support. In one or more address translation service specifications, a memory request between the ATC 324 and the IOMMU 220 may include a transaction header with an "Address Type" (AT) field. This AT field may indicate whether a transaction is a memory request with "Untranslated" address or a memory request with a "Translated" address. The specification may also define an ATC invalidation message.

The device 318 may communicate with pages in memory 311 through the Root-Complex 216, and the IOMMU 220 may use the paging structures 310 to perform the translations that have been discussed that protect against unauthorized access to the pages in memory. General interactions between the ATC 324 of the device 318 and the IOMMU 220 of the Root-Complex 216 will be explained, followed by a more-detailed explanation of each interaction. In one instance, the ATC 324 may send a page request to the Root-Complex 216, to request a page from the pages in memory 311 (329). This page request may enable the ATC 324 to report a page fault to the IOMMU 220. In response, the IOMMU 220 may respond with a page response, to allow the IOMMU to send a page fault response after servicing the page fault (330).

In one embodiment, the ATC 324 may also send a translation request to the IOMMU 220 with a virtual address (whether a guest virtual address (GVA) or an I/O virtual address (IOVA)) for access to a corresponding host physical address (HPA) (331). The IOMMU 220 may then generate an address translation based on a mapping between the GVA (or IOVA) and a guest physical address (GPA), and then a mapping between the GPA and the corresponding HPA, using various paging structures 310 (e.g., paging tables as will be discussed) and in relation to the pages 311 in memory. After the IOMMU 220 completes address mapping in response to the translation request, the IOMMU may respond to the ATC 324 with a translation completion message (332), which contains the HPA (assuming successful translation) and translation data that the device 318 may use to formulate a translated request. The ATC 324 may then send the translated request (e.g., a regular memory read, write, or atomics request with an AT field and the HPA) to the IOMMU 220 to obtain needed data stored at the HPA (334).

The IOMMU 220 may also send an invalidation request to the ATC 324 of the device 318 to invalidate a translation cached in the ATC 324 (336), e.g., because the translation is stale or determined to be invalid for other reasons, such as in response to an invalidation request from software running on the system 200 (350). After the translation has been cleared from the ATC 324, the ATC 324 may send an invalidation completion message to the Root-Complex 216 (340).

The following more-detailed explanation is specific to the PCI-Express® Address Translation Services (ATS) specification and is given by way of example for explanatory purposes and for context throughout the remainder of this disclosure. Using the PCI-Express® ATS specification, however, is not meant to be limiting of the aspects of the disclosure that also apply to other types of I/O devices and protocols. In the following explanation, PASID stands for Process Address Space Identifier. Some DMA requests with a virtual address (or a guest virtual address) may be tagged with a PASID value that identifies the targeted virtual address space.

Translation Request (331): Translation-requests-without-PASID specify the following attributes that are used by remapping hardware to process the request. Address Type (AT), where the AT field has value of 01b to identify it as a translation-request. Address, where an Address field indicates the starting input address for which the translation is requested. Length, where a Length field indicates how many sequential translations may be returned in response to this request. Each translation may be 8 bytes in length. If the length field has a value greater than two, then the additional translations (if returned in the translation response) are for sequentially increasing equal-sized pages starting at the requested input address. No Write (NW) flag, that when set, indicates if the endpoint is requesting read-only access for this translation. Translation requests with PASID specify the same attributes as above, and also specify these additional attributes: PASID value, Execute-Requested (ER) flag, and Privileged-mode-Requested (PR) flag in the PASID prefix.

Translation Completion (332): If the IOMMU 220 was not able to successfully process the translation request (with or without PASID), a translation completion without data is returned. A status code of UR (unsupported request) is returned in the translation completion if the IOMMU 220 is configured to not support translation requests from this device 318. A status code of CR (completer abort) is returned in the translation completion if the IOMMU 220 encountered errors when processing the translation request.

If the remapping hardware was able to successfully process a translation request, a translation completion with data is returned. For successful translation requests without PASID, each translation returned in the translation completion data specifies the following attributes. Size (S), where a value of 0b in Size field indicates the translation is for a 4-KByte page. If the Size field is 1b, the size of the translation is determined by the lowest bit in the translated address field (bits 63:12) with a value of 0. For example, if bit 12 is 0, the translation applies to an 8-KByte page. If bit 12 is 1 and bit 13 is 0, the translation applies to a 16-KByte page, and so on. Non-Snooped access flag (N) that, when set, the non-snooped access field indicates that the translated requests that use this translation must clear the No Snoop Attribute in the request. Untranslated access only flag (U) that, when set, the input address range for the translation can only be accessed by the device 318 using the untranslated request. Read permission (R) that, when set, read permission is granted for the input address range of this translation. If R is clear, read permission is not granted for the input address range of this translation. Write permission (W) that, when set, write permission is granted for the input address range of this translation. If W is clear, write permission is not granted for the input address range of this translation. Translated Address that, when either the R or W field is set, and the U field is clear, the Translated Address field contains the result of the translation for the respective input address. The device 318 can access the page through translated requests with this address.

For successful translation requests with PASID, each translation returned in the translation completion data specifies the same attributes as above, along with following extended attributes: Execute permission (EXE), where if EXE=R=1, execute permission is granted for the input address range of this translation, else, execute permission is not granted for the input address range of this translation. Privilege Mode Access (PRIV), which when set, R, W and EXE refer to permissions associated with privileged mode access, requiring translated requests with PASID using this translation to set the privileged-mode-requested flag in the PASID TLP prefix. If PRIV is clear, R, W, and EXE refer to permissions associated with nonprivileged access, requiring translated-requests with PASID using this translation to clear the privileged-mode-requested flag in the PASID TLP prefix. Global Mapping (G) that, when set, the translation is common across all PASIDs at this device 318. If G is clear, the translation is specific to the PASID value specified in the PASID prefix in the associated translation request, without global impact.

Translated Request (334): Translated requests are regular memory read, write, or atomics requests with address type (AT) field value of 10b. When generating requests to a given input (untranslated) address, the device 318 may look up the local ATC 324 for cached translation (result of previous translation requests) for the input address. If a cached translation is found with appropriate permissions and privilege, the device 318 may generate a translated request (AT=10b) specifying the translated address obtained from the ATC lookup. Translated requests are usually without PASID in referencing a translated HPA, but as will be discussed, now may be with PASID in referencing a translated GPA.

Invalidation Request & Completion (336, 340): Invalidation requests are issued by software through remapping hardware to invalidate translations cached at endpoint device-TLBs. Invalidation-requests-without-PASID specify the following attributes. Device ID is an identity of the device (bus/device/function) whose ATC 324 is the target of invalidation. Size (S), where a value of 0b in the Size field indicates the target of invalidation is a 4-KByte input address range. If Size field is 1b, the input address range to be invalidated is determined by the lowest bit in the Untranslated Address field (bits 63:12) with a value of 0. Untranslated Address specifies the base of the input (untranslated) address range to be invalidated.

The Invalidation Requests with PASID specify the same attributes as above, along with a global invalidate flag. If the global-invalidate flag is 1, the invalidation affects across all PASID values. If the global-invalidate flag is 0, the invalidation is required to affect only the PASID value specified in the PASID Transaction Layer Packet (TLP) prefix. Invalidation requests and completions may carry additional tags (ITags) managed by hardware to uniquely identify invalidation requests and completions.

Figure 4:
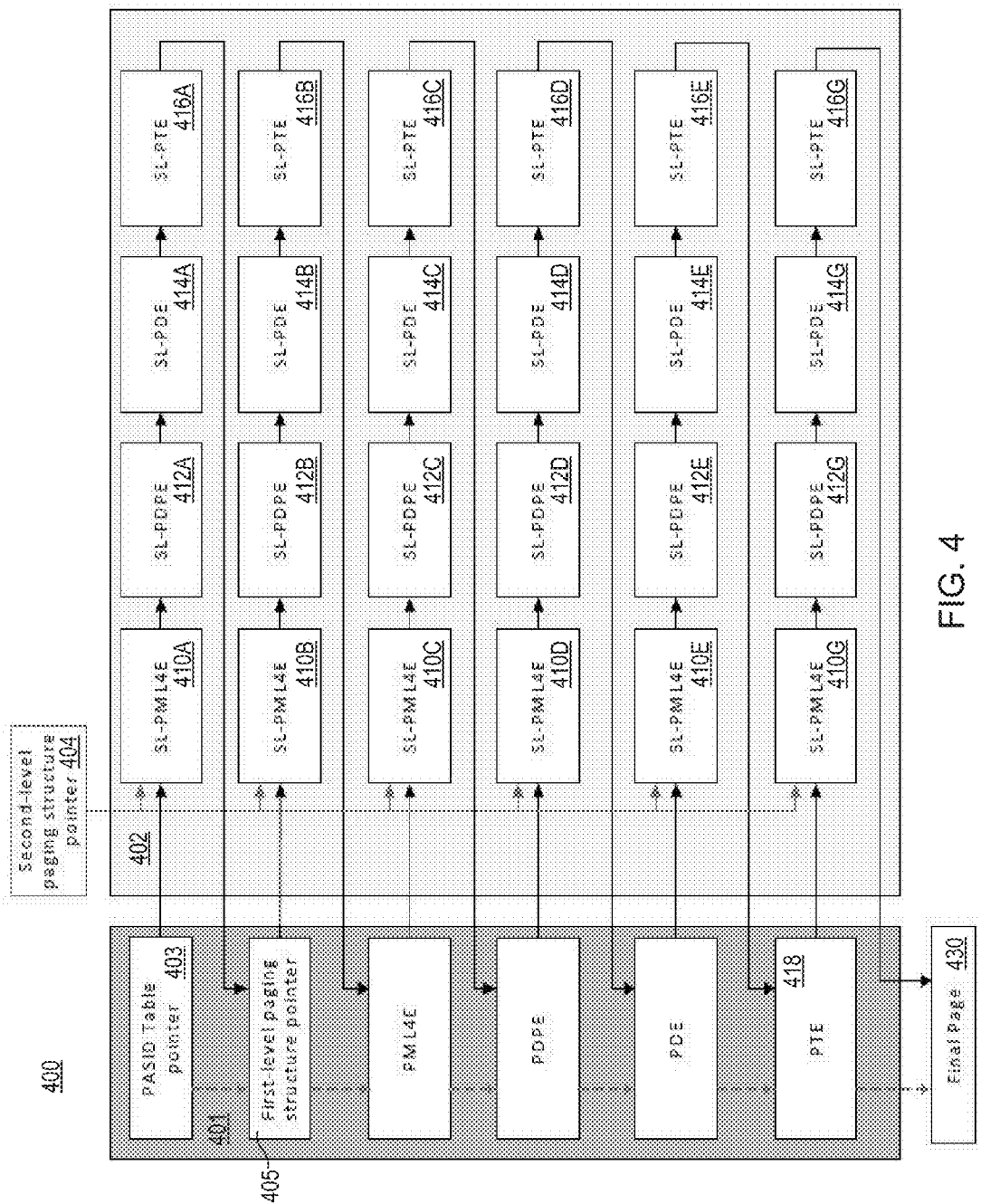
FIG. 4 is a flow chart illustrating nested translation for memory accesses using second-level page tables during virtualized address translations, according to an embodiment of the present disclosure.

FIG. 4 is a flow chart illustrating nested translation 400 for memory accesses using second-level page tables during virtualized address translations, according to an embodiment of the present disclosure. When performing device-to-domain mapping, the IOMMU 220 may perform the domain mapping using an extended-root entry. Context and extended-context entries in the extended-root table can be configured to support second-level translation. Second-level translation may apply to requests-without-PASID, but can also be nested with first-level translation for requests-with-PASID. Context and extended-context-entries contain a pointer to the base of the second-level translation structure. More particularly, in one embodiment, when a nesting enable (NESTE) field is enabled (e.g., set to one (1)) in extended-context entries (see FIG. 5), the IOMMU 220 may also subject requests-with-PASID translated through a plurality of first-level translation structures 401 for first-level translation and to plurality of second-level translation structures 402 for nested second-level translation.

In one embodiment, such extended-context entries contain both a first pointer 403 to the PASID table (which contains a second pointer 405 to first-level translation structures 401) and a third pointer 404 to the second-level translation structures 402. FIG. 4 illustrates nested translation for a request-with-PASID mapped to a 4-KByte page through first-level translation, and interleaved through 4-KByte mappings in second-level paging structures 402, to provide an explanatory example.

TABLE 1

| Paging Structure | Entry Name | Physical Address of Structure | Bits Selecting Entry | Page Mapping |
|---|---|---|---|---|
| PML4 table | PML4E | PASID-entry | 47:33 | N/A |
| Page-directory-pointer table | PDPE | PML4E | 38:30 | 1-GByte page (if Page-Size (PS) field is Set) |
| Page directory | PDE | PDPE | 29:21 | 2-MByte page (if Page-Size (PS) field is set) |
| Page table | PTE | PDE | 20:12 | 4-KByte page |

With nesting, memory accesses generated when processing a request-with-PASID through first-level translation may be subjected to second-level translation. This includes access to PASID table entries, access to first-level paging structure entries (PML4E, PDPE, PDE, PTE, which are explained in Table 1), and access to the output address from first-level translation. With nested translation, a guest operating system running within a virtual machine may utilize first-level translation, while the VMM 115 may virtualize memory by enabling nested second-level translations. In one embodiment, the first-level translation maps an input addresses to a 4-KByte, 2-Mbyte, or 1-GByte pages. Furthermore, the second-level translation may be interleaved at each step to map input addresses to 4-KByte, 2-Mbyte, or 1-GByte pages, for example.

In one embodiment, second-level translation restricts an input address to an implementation-specific address width reported through a maximum guest address width (MGAW) field in an extended capability register 223 of the IOMMU 220. Requests-without-PASID arriving at the IOMMU 220 are subject to MGAW address checking, and any violations are treated as translation-fault.

Second-level translation uses a hierarchical paging structure described in the PCIe® ATS specification. In one embodiment, to allow page-table walks with 9-bit stride (where stride value defines size of the second-level page table), an Adjusted Guest Address Width (AGAW) value for a domain is defined as its Guest Address Width (GAW) value adjusted such that (AGAW-12) is a multiple of 9, for example. The AGAW indicates a number of levels of page-walk through the second-level translation page table. Hardware implementations report the supported AGAWs through the corresponding extended capability register 223.

TABLE 2

| Paging Structure | Entry Name | Physical Address of Structure | Bits Selecting Entry | Page Mapping |
|---|---|---|---|---|
| Second-level PML4 table | SL-PML4E | Context-entry (or Extended-Context-entry) | 47:39 | N/A |
| Second-level Page-dictory-pointer table | SL-PDPE | SL-PML4E[1] | 38:30 | 1-GByte page (is Page Size (PS) field is Set) |
| Second-level Page directory | SL-PDE | SL-PDPE | 29:21 | 2-MByte page (if Page-Size (PS) field in set) |
| Second-level Page table | SL-PTE | SL-PDE | 20:12 | 4-KByte page |

Table 2 gives the different names of the second-level translation structures that are given based on their use in the translation process. Table 2 also provides, for each structure, the source of the physical address used to locate it, the bits in the input-address used to select an entry from the structure, and details of whether and how such an entry can map a page. When interleaved within the nested translations, a first level of a second-level table walk steps through translation structures 410A, 412A, 414A, and 416A, which correspond to the second-level paging structures listed in Table 2. Stepping through a second level of the second-level table walk steps through translation structures 410B, 412B, 414B, and 416B, which likewise correspond to the second-level paging structures of Table 2. The nested translation page-table walk may continue in this manner through second-level paging structures 410C-416C, 410D-416D, and 410E-416E, to generate the page table entry (PTE) of the first-level paging structures that maps the 4 KB page. In this embodiment, by stepping through a final level of the second-level page structures, namely 410G-416G, a final (HPA) page 430 mapping is produced as an output of the nested translation.

To change how the IOMMU 220 handles translation requests and translated requests, additional extended capability registers 223 may report new modes with respect to the translation request and translated request functions that support additional safeguards against DMA requests that would otherwise use cached HPAs in an address translation cache (ATC) 324 of an I/O device. These new modes may also be set within page table entries and ultimately reported to software through an extended capability register 223.

In one embodiment, a restrict-translation-request-response (RTRR) mode, when set, may restrict an HPA from being sent to an ATC 324 of an I/O device. Instead, within the RTRR mode, the IOMMU 220 returns a GPA from a page table entry of the translation. For example, in the case of the nested translation of FIG. 4, the IOMMU may return the GPA of the page table entry (PTE) 418 that is the input to the last second-level translation of a nested page walk. The fact that the I/O device has received a GPA in lieu of an HPA in a translation response is transparent to the ATC 324. In response to an ATC hit of the GPA in the translation request, the ATC may include the GPA in a translated request sent back to the IOMMU. In one embodiment, the ATC 324 may need to send the GPA in the translated request with a PASID. Accordingly, the ATC 324 may include a mode/control bit that software (which enables the RTRR mode in the IOMMU) can use to require the ATC 324 to generate translated requests with the PASID. The control bit may be set within a control register 323 (whether an existing bit in an existing control register or a new bit within a new control register). When the ATC 324 detects the control bit is enabled, the ATC 324 may generate the translated request with the PASID.

The IOMMU 220 may then, upon receipt of the translated request with the GPA, treat the address in the translated request as a GPA, subjecting the GPA to additional translation (which functions as an additional protection check) through the IOMMU's GPA-to-HPA translation as setup by the VMM. If nested translation is enabled, this GPA-to-HPA translation may be to complete the page-table walk, e.g., translation of the GPA by the final level of the second-level paging structures 410G through 416G. Accordingly, if the ATC is compromised and generates malicious addresses in translated requests, the ATC 324 is still subject to the GPA-to-HPA translation like any untranslated requests.

Figure 5:
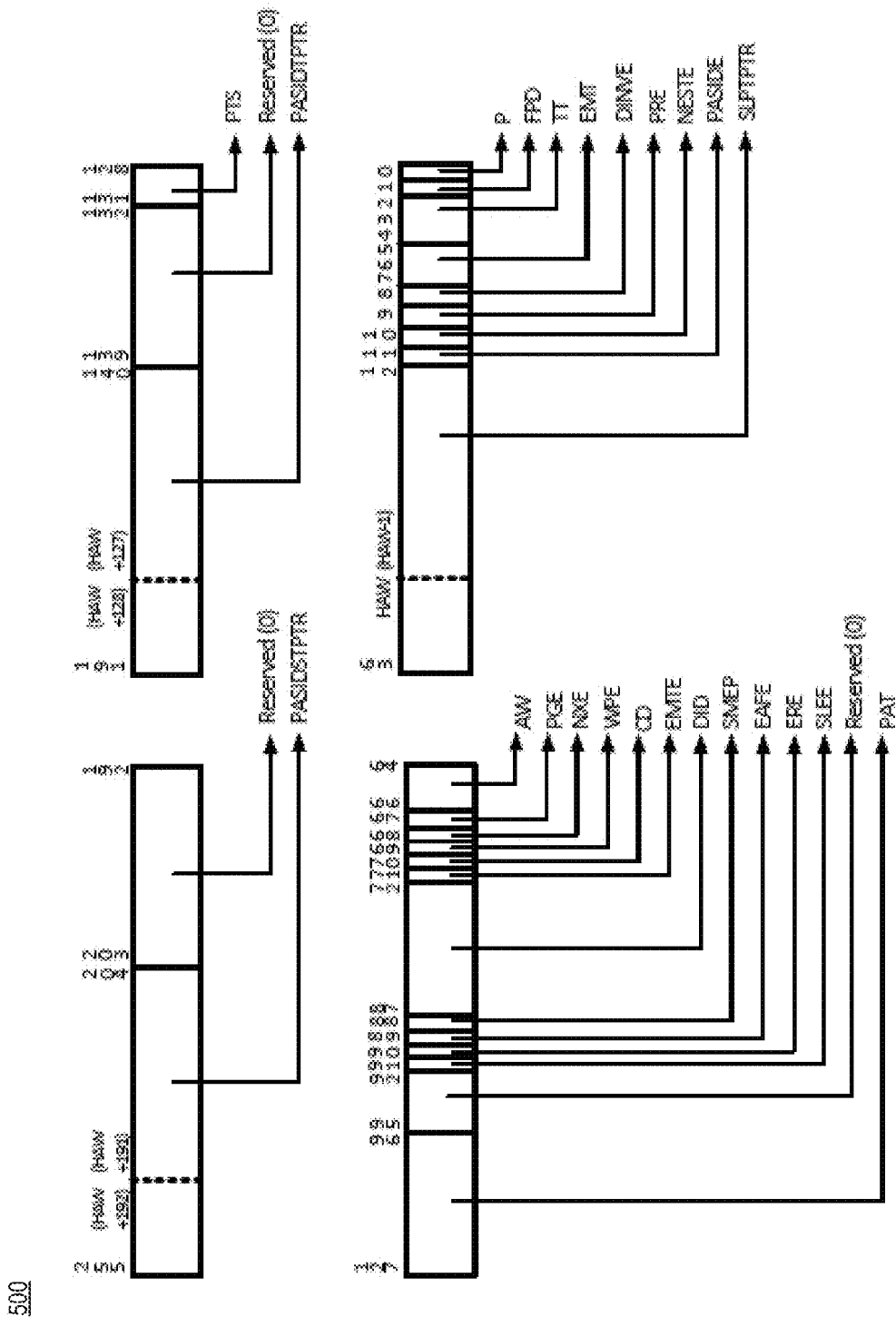
FIG. 5 is a block diagram of a control data structure illustrating an extended-context-entry data structure that supports translation of memory access requests in second-level paging tables, according to an embodiment of the present disclosure.

Because the IOMMU 220 already supports a per-device (e.g., per-I/O device) and a per-address-space control data structures, an RTRR mode field may be included in such a control structure. FIG. 5 is a block diagram of a control data structure 500 illustrating an extended-context-entry data structure that supports translation of memory access requests in second-level paging tables, according to an embodiment of the present disclosure. In this embodiment, the RTRR mode field is included in an extended-context-entry of an extended-root-entry table for second-level translations within the IOMMU 220. The RTRR mode field may be included in any empty or unreserved bit of the extend-context-entry. When the RTRR mode field is set, a bit may be stored within an RTRR extended capability register to signal to the IOMMU 220 and the VMM that a translation request from the I/O device or that is directed to a specific, guest virtual address space is to be treated under the RTRR mode.

Figure 6:
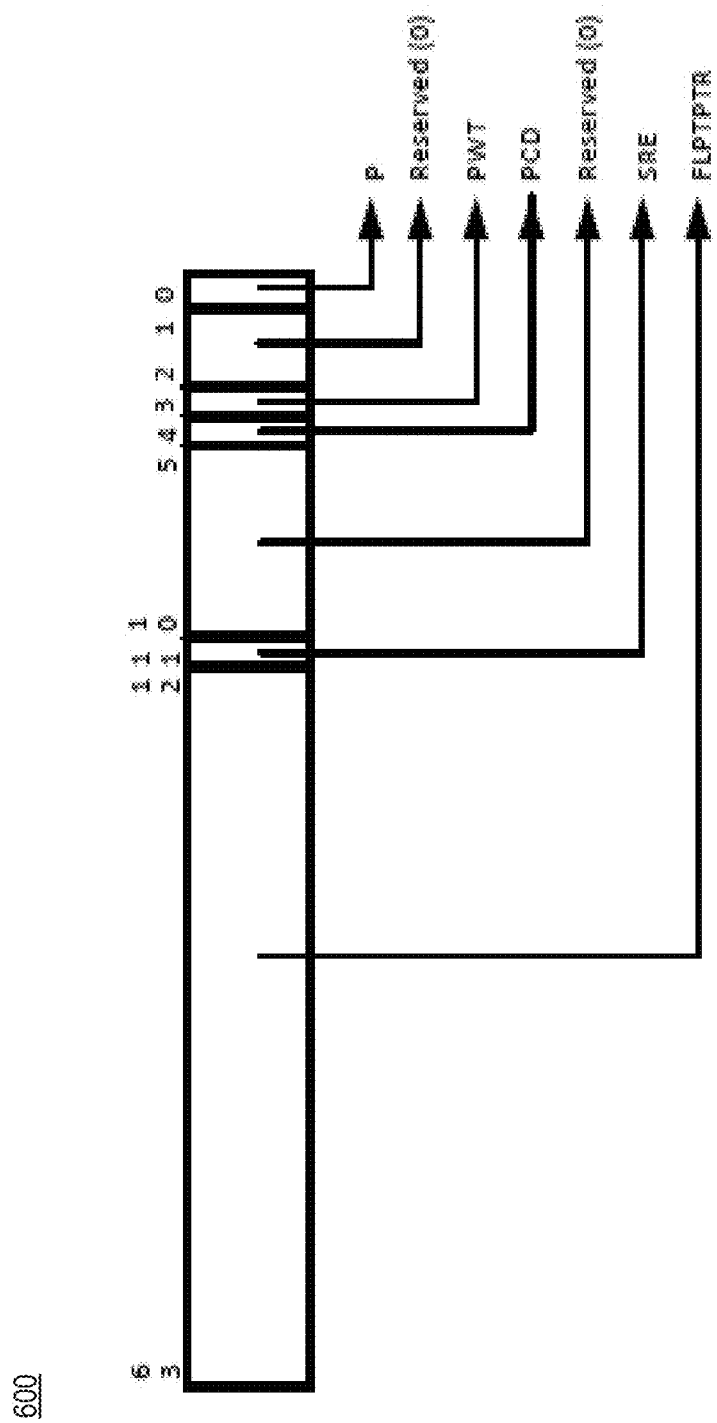
FIG. 6 is a block diagram of a control data structure illustrating a process address space identifier (PASID) entry in a table used to translate memory access requests with PASID, according to an embodiment of the present disclosure.

FIG. 6 is a block diagram of a control data structure 600 illustrating a process address space identifier (PASID) entry in a PASID table used to translate memory access requests with PASID, according to an embodiment of the present disclosure. In another embodiment, the RTRR mode field is added to a PASID entry in the table used to translate memory access requests with PASID, for example. The RTRR mode field may then populate the RTRR extended capability register to signal to the IOMMU 220 and the VMM that a translation request from the I/O device or that is directed to a specific address space is to be treated under the RTRR mode.

Under the RTRR mode, GPAs are now cached in an ATC 324 of an I/O device 318. Any VMM paging of guest physical addresses does not depend on an existing method of modifying the GPA-to-HPA mapping as not-present and performing IOTLB and ATC invalidation to page out a GPA. This is because performing these steps would cause non-recoverable faults to any currently-pending translated requests because these are subject to GPA-to-HPA translations.

Instead, a new no-permission-on-translation-request-response (NP-TRSP) field may be added to present second-level paging entries, and a NP-TRSP extended capability register may also be added to, when set, signal to the IOMMU 220 and the VMM 115 to treat a translation request differently. For example, when the NP-TRSP field is set, a translation entry in a translation response may be set to null permissions (e.g., R=W=X=0) whether or not the translation to the HPA was successful. Additional use for the NP-TRSP field will be described below.

Figure 7:
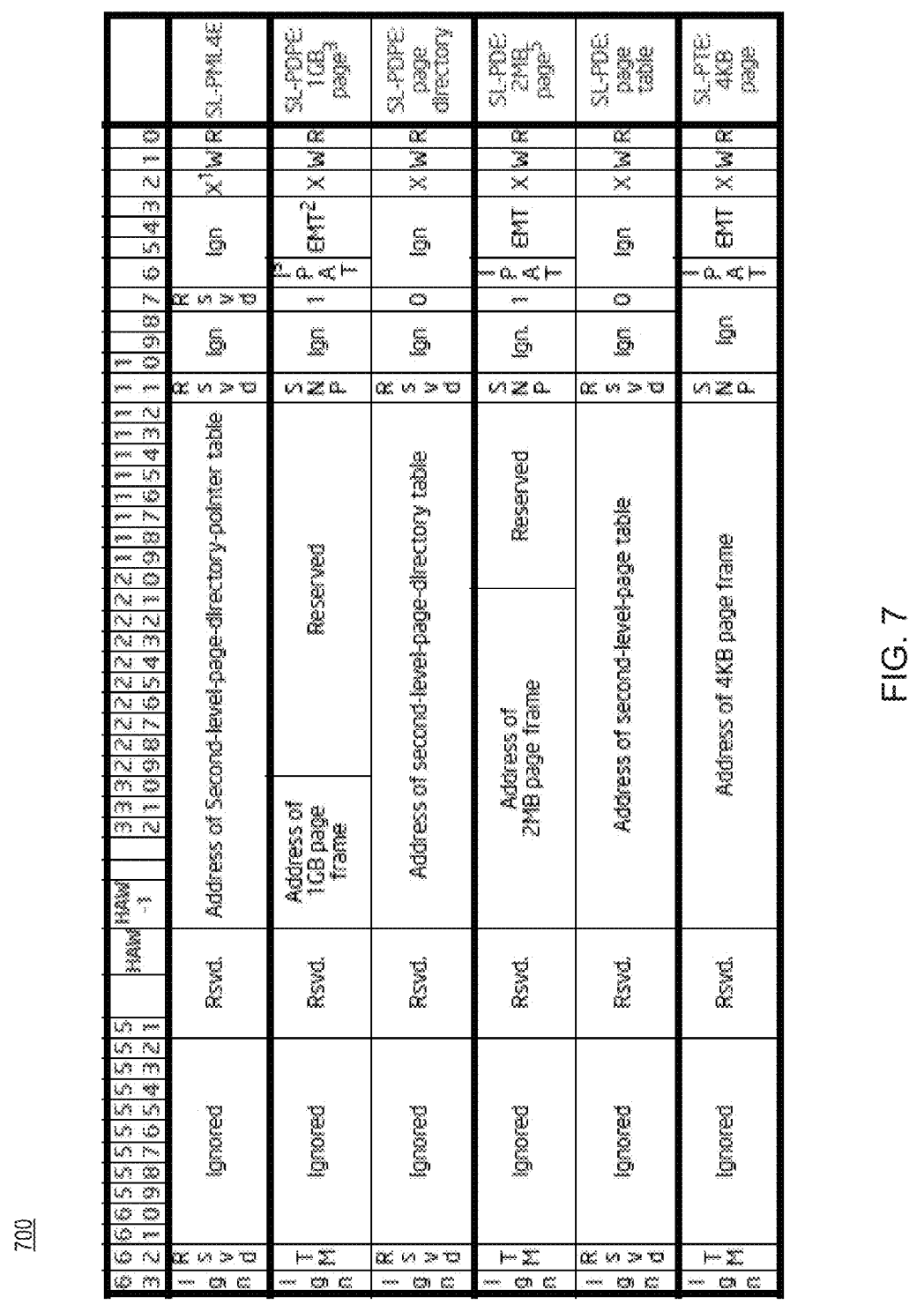

FIG. 7 is a table 700 that illustrates second-level paging entries that support a second level of address translation performed by an IOMMU 220, according to an embodiment of the present disclosure. Note that the IOMMU 220 supports two levels of address translation (first level and second level). The second level address translation is used by VMMs to perform GPA-to-HPA translation. In one embodiment, the NP-TRSP mode field is added to a second level paging entry. For example, the NP-TRSP mode field can be added to any unused field such as any of bits 8-10 or 52-61 in the second-level paging entries of FIG. 7.

Figure 8:
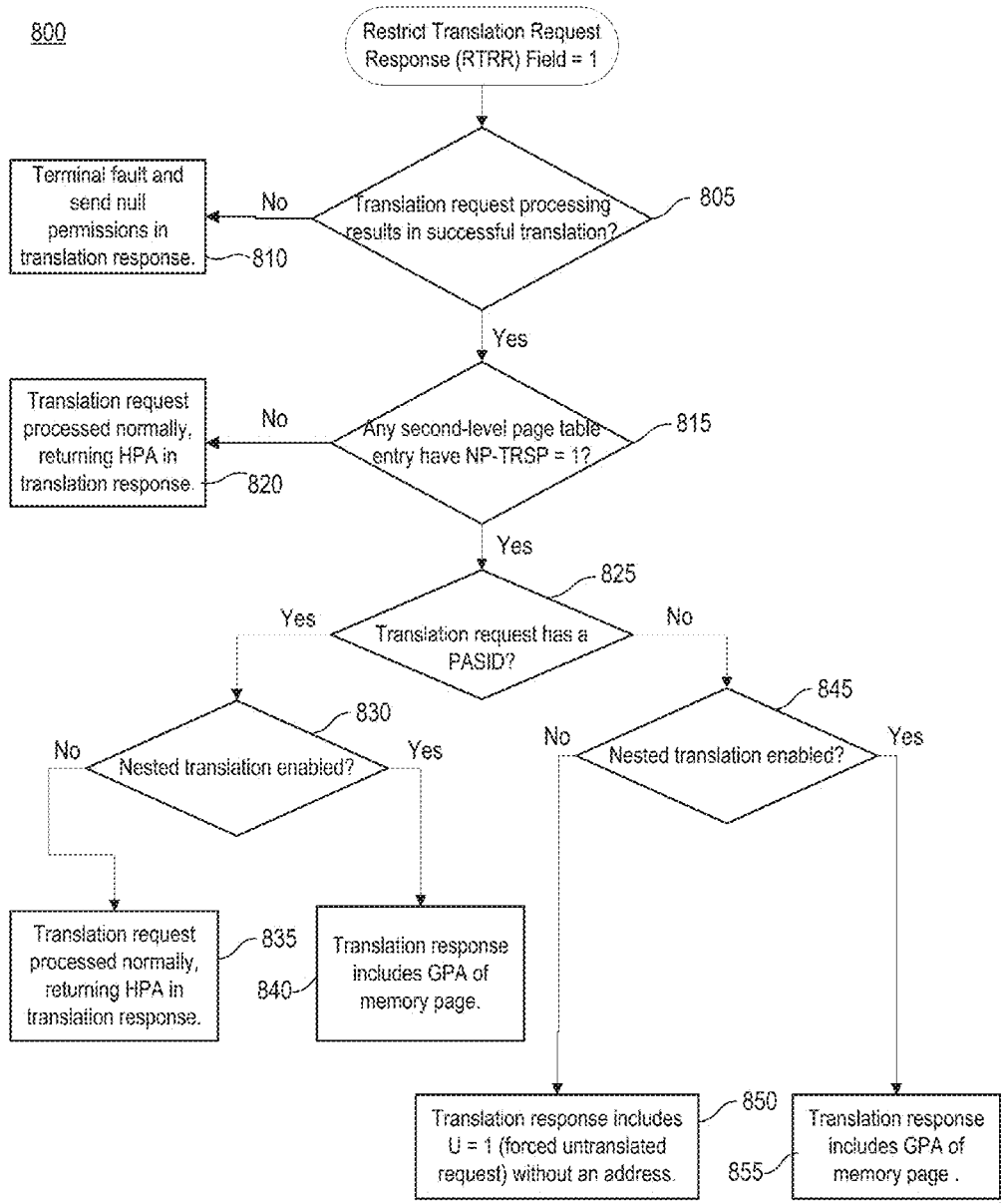
FIG. 8 is a flow chart of a method for IOMMU handling of translation requests using certain response restrictions.

FIG. 8 is a flow chart 800 of a method for IOMMU handling of translation requests using certain response restrictions where the restrict-translation-request-response (RTRR) mode is set (as previously discussed). The method 800 may be performed by a system that may include hardware (e.g., circuitry, dedicated logic, and/or programmable logic), software (e.g., instructions executable on a computer system to perform hardware simulation), or a combination thereof. In an illustrative example, the method 800 may be performed by the IOMMU 120 or 220 of FIGS. 1-3.

Referring to FIG. 8, the method 800 may start where the IOMMU, in response to receipt of a translation request from an I/O device, determines whether translation request processing results in a successful translation of a virtual address (805). If the answer is no in block 805, a likely result is a terminal fault, in which case the IOMMU may send, to the I/O device, a translation response having null permissions with respect to access rights to any resulting HPA (e.g., R=W=X=0) (810). If the answer is yes in block 805, the method may continue with the IOMMU further determining whether any second-level paging entry includes a no-permission-on-translation-request-response (NP-TRSP) field set to one ("1") (815). If the answer is no to block 815, the method may continue with the IOMMU processing the translation request normally by sending a translated HPA to the I/O device in the translation response (820). If the answer is yes in block 815, the method may continue with the IOMMU determining whether the translation request includes a process address space identifier (PASID) (825).

In one embodiment, if translation of a virtual address was successful, the NP-TRSP field is not set within a second-level page table entry, and the translation request is with PASID, the method may continue with the IOMMU determining whether nested translation is enabled (830). If nested translation is disabled, then the translation request is not subject to second-level translation and the IOMMU may process the translation request normally by sending a translated HPA to the I/O device in the translation response (835). If nested translation is enabled for the translation request with PASID, the IOMMU translates a guest virtual address (GVA) to a GPA and then translates the GPA to an HPA, but includes only the GPA of the memory page in the translation response (840).

In one embodiment, if translation of a virtual address was successful, the NP-TRSP field is not set within a second-level paging entry, and the translation request is without PASID, the method may continue with the IOMMU determining whether nested translation is enabled (845). If nested translation is disabled, the IOMMU may include, within the translation response, a set untranslated access only flag (U) without returning any address (850). This type of translation response forces the I/O device to generate an untranslated request (without PASID) with the input address (whether a GPA or an IOVA). If nested translation is not enabled at block 845, the IOMMU may transmit the GPA within the translation response (855). A nested translation without PASID translates an I/O virtual address (IOVA) (that references an I/O virtual address space) to a GPA, and translates the GPA (associated with a guest physical address space) to an HPA. But, instead of sending the translated HPA, the IOMMU in this case may transmit only the GPA so that the GPA requires further translation after being sent in a translated request.

Figure 9:
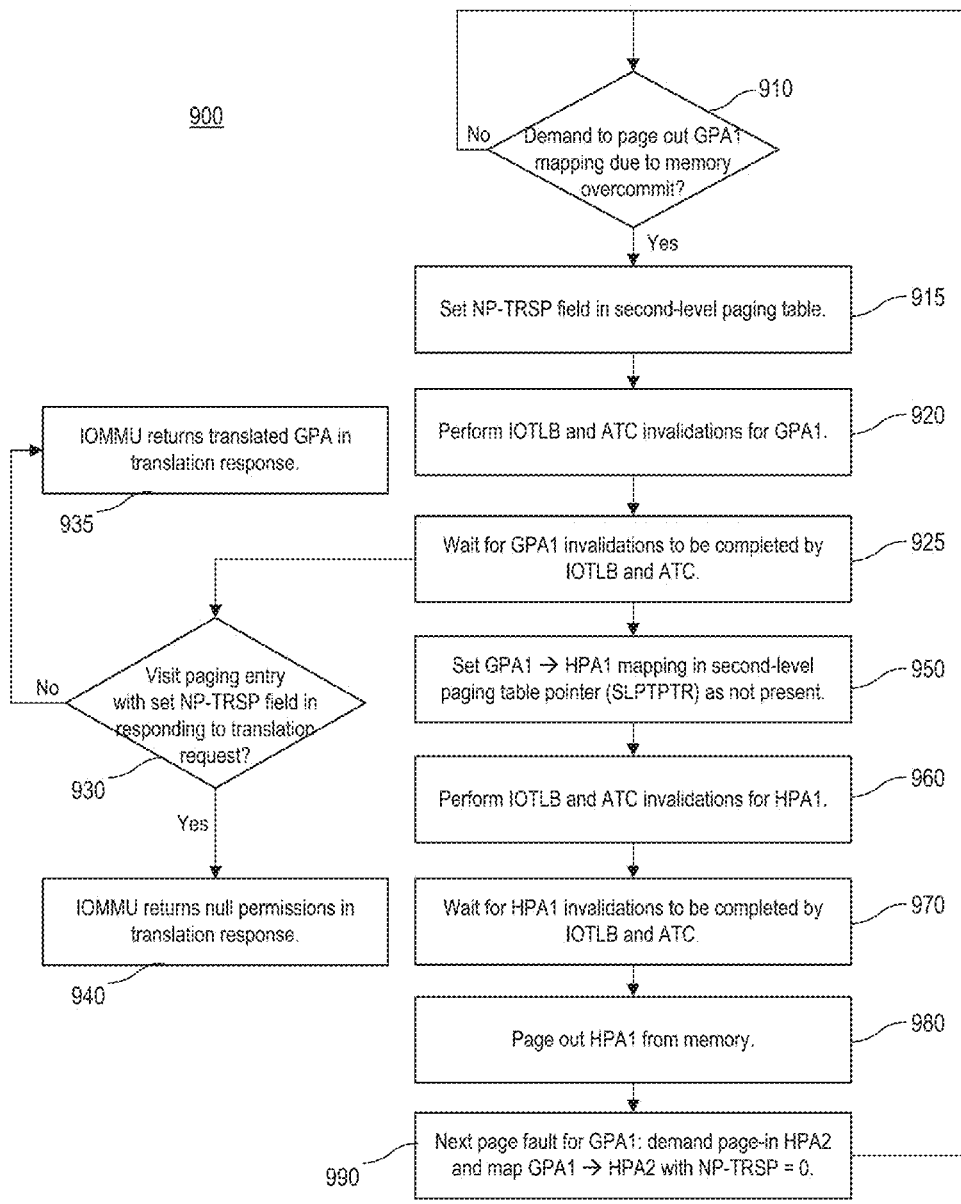
FIG. 9 is a flow chart of a method for IOMMU handling of a paging sequence during a memory overcommit when employing the translation response restrictions of FIG. 8.

FIG. 9 is a flow chart of a method 900 for IOMMU handling of a paging sequence during a memory overcommit when employing the translation response restrictions of FIG. 8. The method 900 may be performed by a system that may include hardware (e.g., circuitry, dedicated logic, and/or programmable logic), software (e.g., instructions executable on a computer system to perform hardware simulation), or a combination thereof. In an illustrative example, the method 800 may be performed by the VMM 115 of FIG. 1 in conjunction with the IOMMU 120 or 220 of FIGS. 1-3.

Because GPAs are now being cached in an ATC of an I/O device, and DMA requests (e.g., translated requests) from the I/O device include the GPA and not an HPA, the VMM 115 may need an additional set of steps that first signal invalidation of cached GPAs within second level paging structures when faced with a page fault. This invalidation may be performed so that any new translation request that maps to an invalid GPA results in null permissions in a translation response from the IOMMU.

More specifically, referring to FIG. 9, the method 900 may start where the VMM, in response to a translation request, may determine whether a guest physical address (referred to as GPA1 for purposes of this explanation) needs to be paged out of memory due a page fault (e.g., a memory overcommit that demands that a HPA be paged in) (910). If the answer is yes, then the method may continue with the VMM setting the no-permission-on-translation-request-response (NP-TRSP) field in a second-level paging table corresponding to a mapping between GPA1 and a host physical address (called HPA1 for purposes of explanation) (915). The method may continue with the VMM also requesting an IOTLB invalidation (to clear GPA1 out of the IOTLB of the IOMMU) and an ATC invalidation (to clear GPA1 out of the ATC of the I/O device) of the cached GPA1 address (920) and waiting for completion of the GPA1 invalidations by the IOTLB and the ATC (925). The invalidation process was described in more detail previously.

The method 900 may continue with the IOMMU determining, during a translation request having a virtual address that maps to GPA1, whether the NP-TRSP field within a paging entry of a second-level paging table is set (930). If the answer is no, the NP-TRSP field is zero ("0"), the IOMMU may proceed as normal with translating the virtual address to a GPA, translating GPA to a corresponding HPA, and transmitting the translated GPA in a translation response to the I/O device (935). If the answer is yes in block 930, the IOMMU may transmit null permissions as to access rights to the memory page of HPA1 in a translation response to the I/O device (940). Accordingly, the NP-TRSP field and the invalidations of the GPA1 address ensures that any new translation requests having GPA1 are drained (e.g., taken out of the translation pipeline process explained with reference to FIG. 3).

Now that the cached GPA1 has been invalidated, the method may continue with the VMM setting the GPA1-to-HPA1 mapping in the second-level paging table pointer (SLPTPTR) as not present (950). This step at block 950 may be the same as setting the execute (X), write (W), and read (R) permissions in a second-level paging table entry (FIG. 7) for the GPA1-to-HPA1 mapping to zero ("0"). The method may continue with the VMM performing invalidations of any cached HPA1 in the IOTLB (of the IOMMU) and the ATC (of the I/O device) (960) and waiting for completion of the HPA1 invalidations by the IOTOLB and the ATC (970). Once these steps are complete, the supporting structures and data backing the GPA1-to-HPA1 mapping have been removed and it is safe to page out data from the HPA1 address of main memory to some external storage device, for example (980). Having completed a paging out of HPA1, upon a next page fault (e.g., a translation request for GPA1 that is no longer cached), the method may continue by demanding a page-in of a new HPA (called HPA2 for purposes of explanation) and mapping GPA1 to HPA2 with the NP-TRSP field reset to zero ("0") (990). The method 900 may then continue iterations starting at block 905, but with respect to the GPA1-to-HPA2 mapping.

Figure 10:
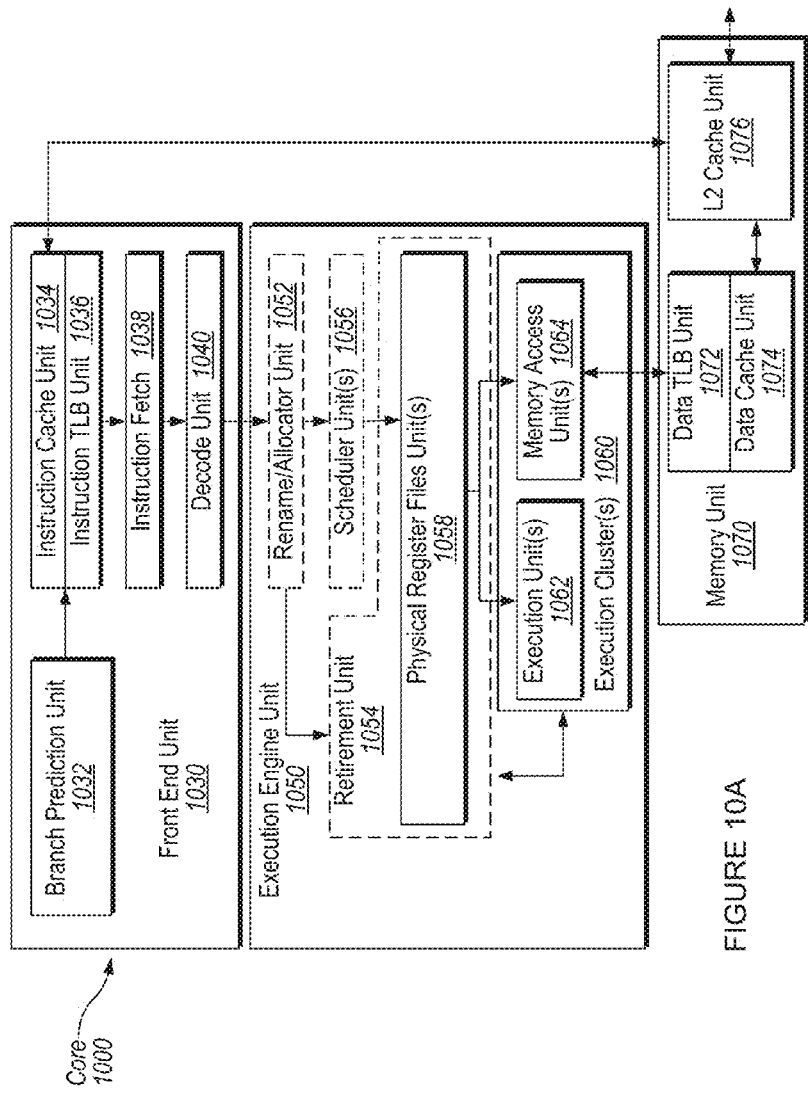
FIG. 10A is a block diagram illustrating a micro-architecture for a processor core that can be incorporated into the root complex of FIGS. 2-3.
FIG. 10B is a block diagram illustrating an in-order pipeline and a register renaming stage, out-of-order issue/execution pipeline implemented by the processor core of FIG. 10A according to some embodiments of the disclosure.

FIG. 10A is a block diagram illustrating a micro-architecture for a processor core 1000 that can be incorporated into the root complex of FIGS. 2-3. Specifically, processor core 1000 depicts an in-order architecture core and a register renaming logic, out-of-order issue/execution logic to be included in a processor according to at least one embodiment of the disclosure. The embodiments of the error correcting code that carry additional bits can be implemented by processor core 1000.

The processor core 1000 includes a front end unit 1030 coupled to an execution engine unit 1050, and both are coupled to a memory unit 1070. The processor core 1000 can include a reduced instruction set computing (RISC) core, a complex instruction set computing (CISC) core, a very long instruction word (VLIW) core, or a hybrid or alternative core type. As yet another option, processor core 1000 can include a special-purpose core, such as, for example, a network or communication core, compression engine, graphics core, or the like. In one embodiment, processor core 1000 can be a multi-core processor or can be part of a multi-processor system.

The front end unit 1030 includes a branch prediction unit 1032 coupled to an instruction cache unit 1034, which is coupled to an instruction translation lookaside buffer (TLB)

1036, which is coupled to an instruction fetch unit 1038, which is coupled to a decode unit 1040. The decode unit 1040 (also known as a decoder) can decode instructions, and generate as an output one or more micro-operations, microcode entry points, microinstructions, other instructions, or other control signals, which are decoded from, or which otherwise reflect, or are derived from, the primary instructions. The decoder 1040 can be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations (RS), central instruction window, etc. The scheduler unit(s) 1056 can be coupled to the physical register file unit(s) 1058. Each of the physical register file unit(s) 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 can be overlapped by the retirement unit 1054 to illustrate various ways in which register renaming and out-of-order execution can be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 can perform various operations (e.g., shifts, addition, subtraction, multiplication) and operate on various types of data (e.g., scalar floating point, packed integer, packed floating point, vector integer, vector floating point).

While some embodiments can include a number of execution units dedicated to specific functions or sets of functions, other embodiments can include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines can be out-of-order issue/execution and the rest in-order.

The set of memory access units 1064 can be coupled to the memory unit 1070, which can include a data prefetcher 1080, a data TLB unit 1072, a data cache unit (DCU) 1074, and a level 2 (L2) cache unit 1076, to name a few examples. In some embodiments DCU 1074 is also known as a first level data cache (L1 cache). The DCU 1074 can handle multiple outstanding cache misses and continue to service incoming stores and loads. It also supports maintaining cache coherency. The data TLB unit 1072 is a cache used to improve virtual address translation speed by mapping virtual and physical address spaces. In one exemplary embodiment, the memory access units 1064 can include a load unit, a store address unit, and a store data unit, each of which is coupled to the data TLB unit 1072 in the memory unit 1070. The L2 cache unit 1076 can be coupled to one or more other levels of cache and eventually to a main memory.

In one embodiment, the data prefetcher 1080 speculatively loads/prefetches data to the DCU 1074 by automatically predicting which data a program is about to consume. Prefetching can refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching can refer to the early retrieval of data from one of the lower level caches/memory to a data cache and/or to prefetch buffer before the processor issues a demand for the specific data being returned.

The processor core 1000 can support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core can support multithreading (executing two or more parallel sets of operations or threads), and can do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming can be used in an in-order architecture. While the illustrated embodiment of the processor also includes a separate instruction and data cache units and a shared L2 cache unit, alternative embodiments can have a single internal cache for both instructions and data, such as, for example, a Level 1 (L1) internal cache, or multiple levels of internal cache. In some embodiments, the system can include a combination of an internal cache and an external cache that is external to the core and/or the processor. Alternatively, all of the cache can be external to the core and/or the processor.

FIG. 10B is a block diagram illustrating an in-order pipeline and a register renaming stage, out-of-order issue/execution pipeline implemented by processor core 1000 of FIG. 10A according to some embodiments of the disclosure.

The solid lined boxes in FIG. 10B illustrate an in-order pipeline, while the dashed lined boxes illustrates a register renaming, out-of-order issue/execution pipeline. In FIG. 10B, a processor pipeline 1090 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024. In some embodiments, the ordering of stages 1002-1024 can be different than illustrated and are not limited to the specific ordering shown in FIG. 10B.

Figure 11:
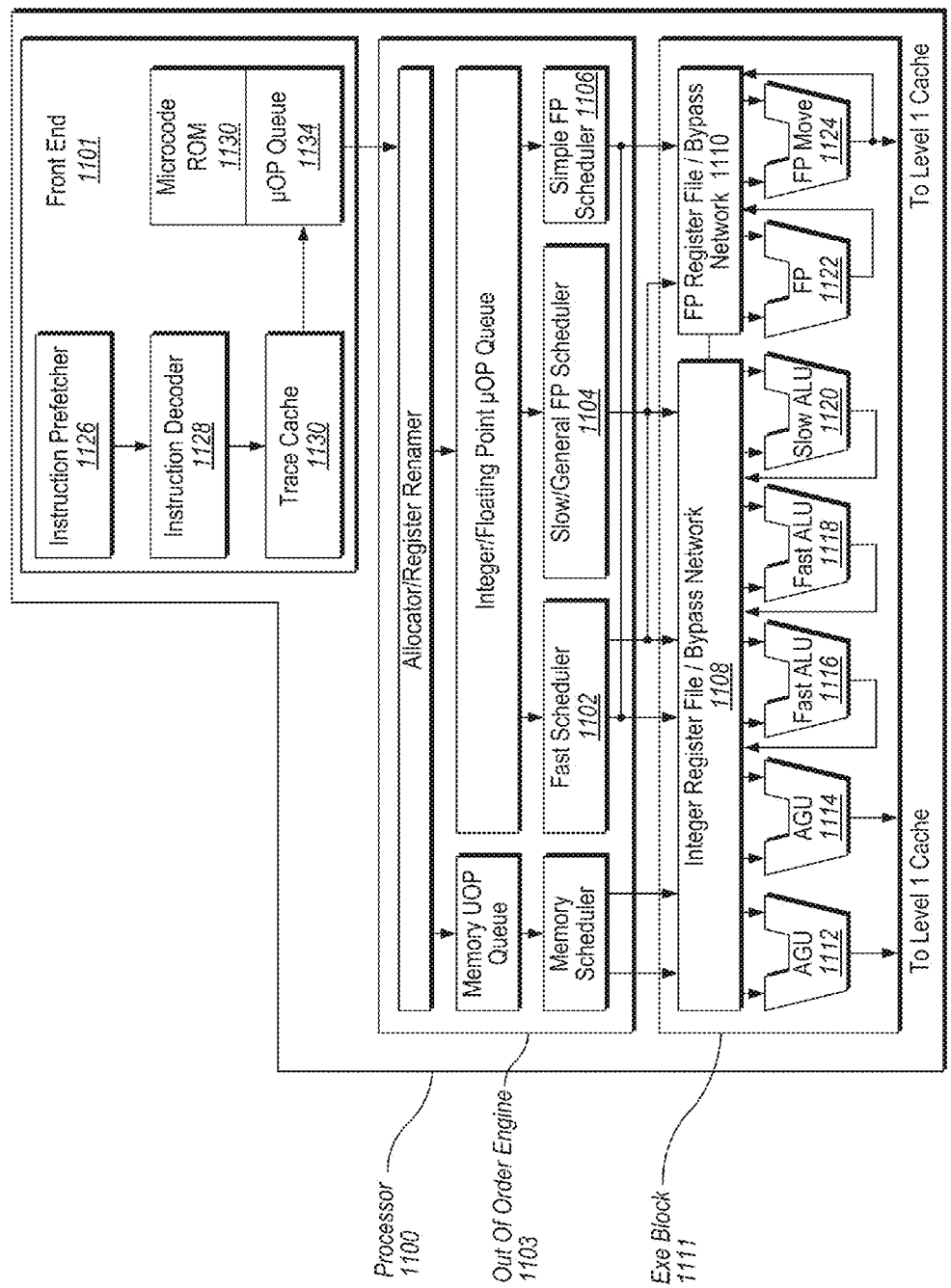
FIG. 11 illustrates a block diagram of the micro-architecture for a processor that, in one embodiment, can represent portions of the root complex of FIGS. 2-3.

FIG. 11 illustrates a block diagram of the micro-architecture for a processor 1100 (which can represent the root complex of FIGS. 2-3 in one embodiment) that includes logic circuits. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 1101 is the part of the processor 1100 that fetches instructions to be executed and prepares them to be used later in the processor pipeline.

The front end 1101 can include several units. In one embodiment, the instruction prefetcher 1116 fetches instructions from memory and feeds them to an instruction decoder 1118 which in turn decodes or interprets them. For example, in one embodiment, the decoder decodes a received instruction into one or more operations called "micro-instructions" or "micro-operations" (also called micro-op or μops) that the machine can execute. In other embodiments, the decoder parses the instruction into an opcode and corresponding data and control fields that are used by the micro-architecture to perform operations in accordance with one embodiment. In one embodiment, the trace cache 1130 takes decoded μops and assembles them into program ordered sequences or traces in the μop queue 1134 for execution. When the trace cache 1130 encounters a complex instruction, the microcode ROM (or RAM) 1132 can provide the μops needed to complete the operation.

Some instructions are converted into a single micro-op, whereas others need several micro-ops to complete the full operation. In one embodiment, if more than four micro-ops are needed to complete an instruction, the decoder 1118 accesses the microcode ROM 1132 to do the instruction. For one embodiment, an instruction can be decoded into a small number of micro ops for processing at the instruction decoder 1118. In another embodiment, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The μop schedulers 1102, 1104, 1106, determine when a uop is ready to execute based on the readiness of their dependent input register operand sources and the availability of the execution resources the μops need to complete their operation. The fast scheduler 1102 of one embodiment can schedule on each half of the main clock cycle while the other schedulers can only schedule once per main processor clock cycle. The schedulers arbitrate for the dispatch ports to schedule μops for execution.

Register files 1108, 1111, sit between the schedulers 1102, 1104, 1106, and the execution units 1112, 1114, 1116, 1118, 1120, 1122, 1124 in the execution block 1111. There is a separate register file 1108, 1110, for integer and floating point operations, respectively. Each register file 1108, 1110, of one embodiment also includes a bypass network that can bypass or forward just completed results that have not yet been written into the register file to new dependent μops. The integer register file 1108 and the floating point register file 1110 are also capable of communicating data with the other. For one embodiment, the integer register file 1108 is split into two separate register files, one register file for the low order 32 bits of data and a second register file for the high order 32 bits of data. The floating point register file 1110 of one embodiment has 128 bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating point data operand values that the micro-instructions need to execute. The processor 1100 of one embodiment is comprised of a number of execution units: address generation unit (AGU) 1112, AGU 1114, fast ALU 1116, fast ALU 1118, slow ALU 1120, floating point ALU 1122, floating point move unit 1114. For one embodiment, the floating point execution blocks 1122, 1124, execute floating point, MMX, SIMD, and SSE, or other operations. The floating point ALU 1122 of one embodiment includes a 64-bit-by-64-bit floating point divider to execute divide, square root, and remainder micro-ops. For embodiments of the present disclosure, instructions involving a floating point value can be handled with the floating point hardware.

In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1112, 1114. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1122, 1124, can be implemented to support a range of operands having bits of various widths. For one embodiment, the floating point units 1122, 1124, can operate on 128 bits wide packed data operands in conjunction with SIMD and multimedia instructions.

In one embodiment, the μops schedulers 1102, 1104, 1106, dispatch dependent operations before the parent load has finished executing. As μops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1100 also includes logic to implement compression/decompression optimization in solid-state memory devices according to one embodiment. In one embodiment, the execution block 1111 of processor 1100 can include MCU 115, to perform compression/decompression optimization in solid-state memory devices according to the description herein.

The term "registers" can refer to the on-board processor storage locations that are used as part of instructions to identify operands. In other words, registers can be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128-bit wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data can be stored in different registers or the same registers.

Figure 12:
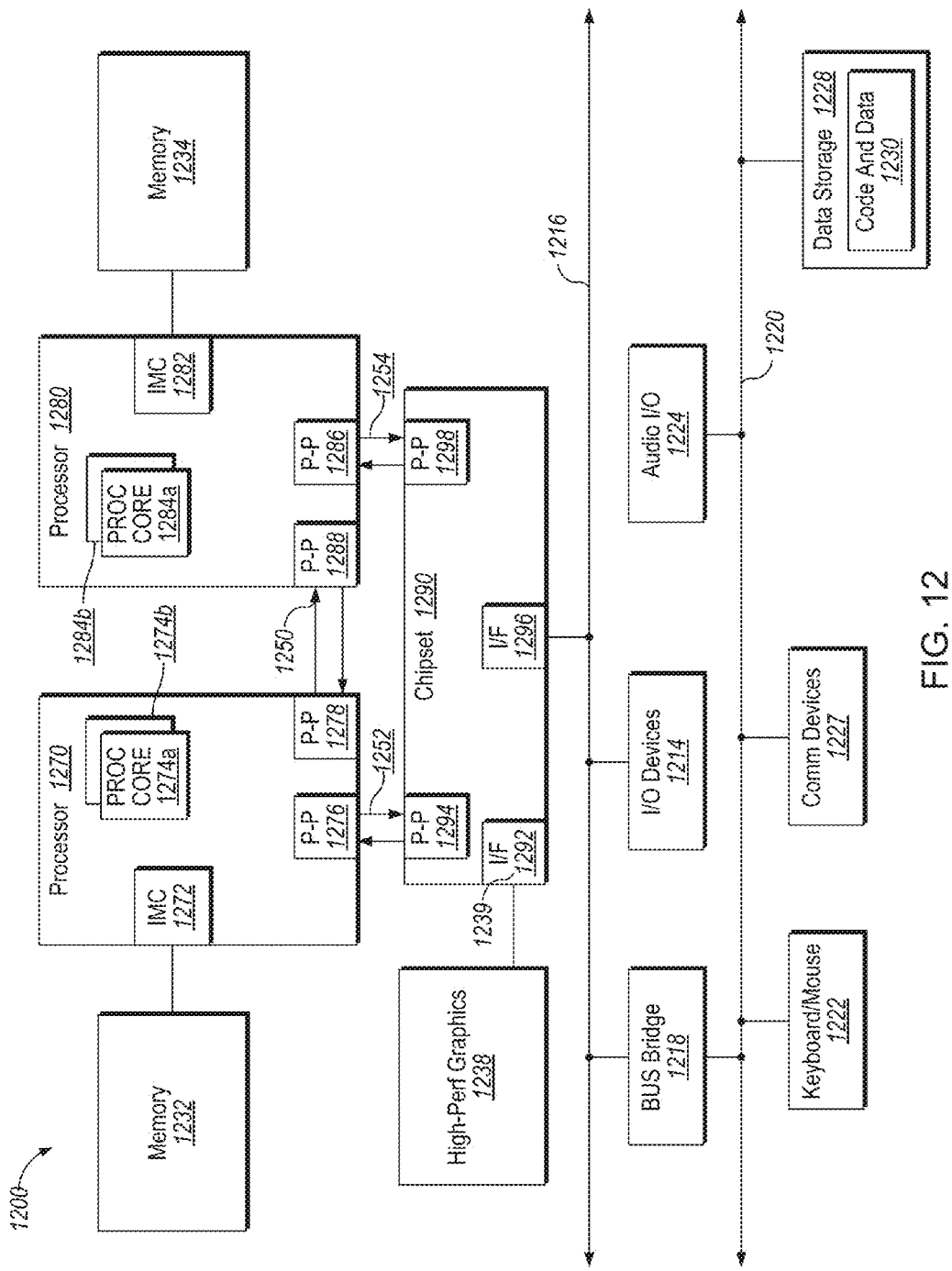
FIG. 12 is a block diagram of a multi-processor system according to one implementation.

Embodiments can be implemented in many different system types. Referring now to FIG. 12, shown is a block diagram of a multiprocessor system 1200 in accordance with an implementation. As shown in FIG. 12, multiprocessor system 1200 is a point-to-point interconnect system, and includes a first processor 1270 and a second processor 1280 coupled via a point-to-point interconnect 1250. As shown in FIG. 12, each of processors 1270 and 1280 can be multicore processors, including first and second processor cores (i.e., processor cores 1274a and 1274b and processor cores 1284a and 1284b), although potentially many more cores can be present in the processors. The processors each can include hybrid write mode logics in accordance with an embodiment of the present. The embodiments of the page additions and content copying can be implemented in the processor 1270, processor 1280, or both.

While shown with two processors 1270, 1280, it is to be understood that the scope of the present disclosure is not so limited. In other implementations, one or more additional processors can be present in a given processor.

Processors 1270 and 1280 are shown including integrated memory controller units 1272 and 1282, respectively. Processor 1270 also includes as part of its bus controller units point-to-point (P-P) interfaces 1276 and 1288; similarly, second processor 1280 includes P-P interfaces 1286 and 1288. Processors 1270, 1280 can exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which can be portions of main memory locally attached to the respective processors.

Processors 1270, 1280 can each exchange information with a chipset 1290 via individual P-P interfaces 1252, 1254 using point to point interface circuits 1276, 1294, 1286, 1298. Chipset 1290 can also exchange information with a high-performance graphics circuit 1238 via a high-performance graphics interface 1239.

A shared cache (not shown) can be included in either processor or outside of both processors, yet connected with the processors via P-P interconnect, such that either or both processors' local cache information can be stored in the shared cache if a processor is placed into a low power mode.

Chipset 1290 can be coupled to a first bus 1216 via an interface 1296. In one embodiment, first bus 1216 can be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 can be coupled to first bus 1216, along with a bus bridge 1218 which couples first bus 1216 to a second bus 1220. In one embodiment, second bus 1220 can be a low pin count (LPC) bus. Various devices can be coupled to second bus 1220 including, for example, a keyboard and/or mouse 1222, communication devices 1227 and a storage unit 1228 such as a disk drive or other mass storage device which can include instructions/code and data 1230, in one embodiment. Further, an audio I/O 1224 can be coupled to second bus 1220. Note that other architectures are possible. For example, instead of the point-to-point architecture of FIG. 12, a system can implement a multi-drop bus or other such architecture.

Figure 13:
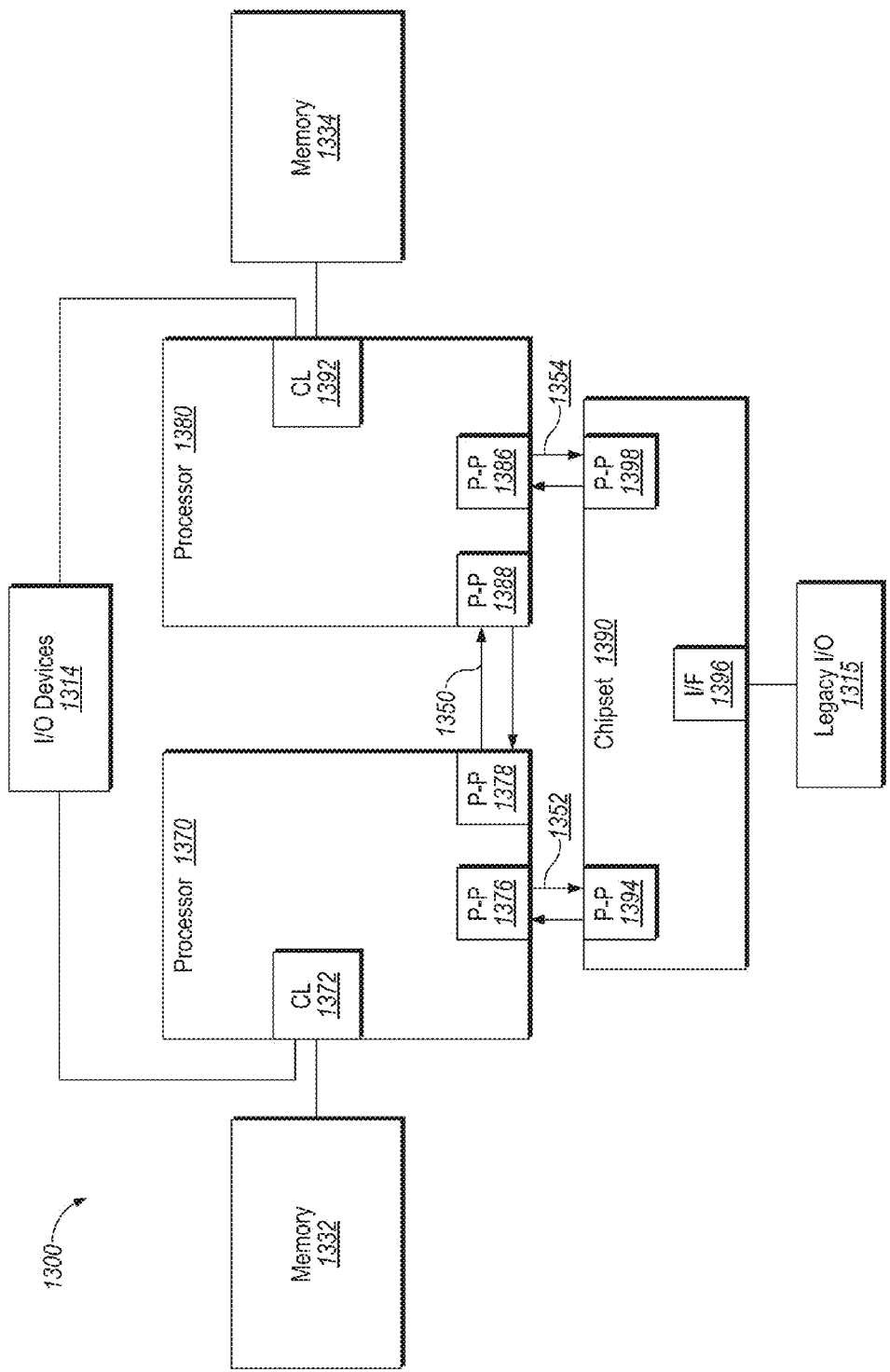
FIG. 13 is a block diagram of a multi-processor system according to another implementation.

Referring now to FIG. 13, shown is a block diagram of a third system 1300 in accordance with an embodiment of the present disclosure. Like elements in FIGS. 12 and 13 bear like reference numerals, and certain aspects of FIG. 12 have been omitted from FIG. 12 in order to avoid obscuring other aspects of FIG. 13.

FIG. 13 illustrates that the processors 1370, 1380 can include integrated memory and I/O control logic ("CL") 1372 and 1382, respectively. For at least one embodiment, the CL 1372, 1382 can include integrated memory controller units such as described herein. In addition, CL 1372, 1382 can also include I/O control logic. FIG. 13 illustrates that the memories 1332, 1334 are coupled to the CL 1372, 1382, and that I/O devices 1314 are also coupled to the control logic 1372, 1382. Legacy I/O devices 1315 are coupled to the chipset 1390. The embodiments of the page additions and content copying can be implemented in processor 1370, processor 1380, or both.

Figure 14:
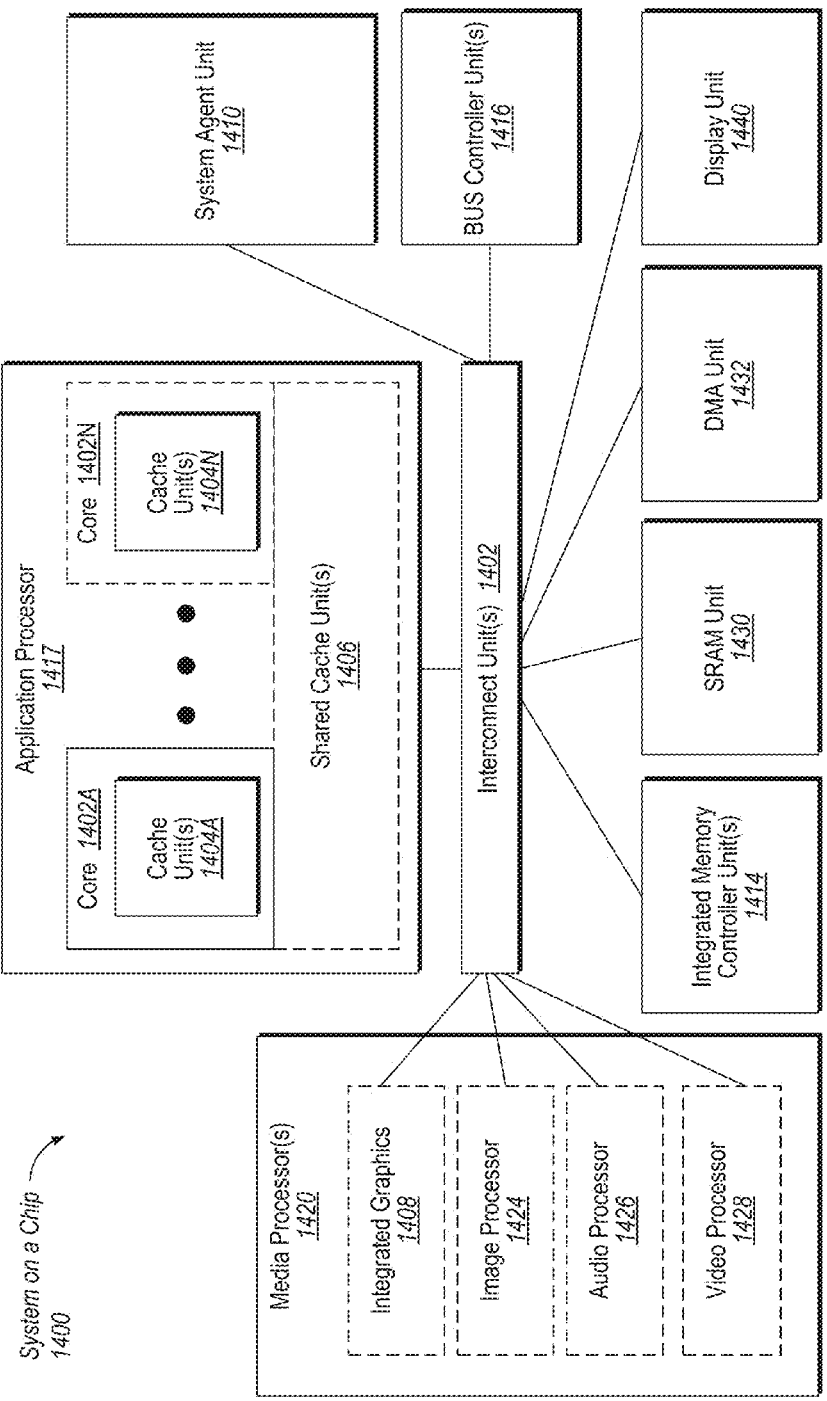
FIG. 14 is a block diagram of a system-on-a-chip according to one implementation.

FIG. 14 is an exemplary system on a chip (SoC) 1400 that can include one or more of the cores 1402. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

With further reference to the SOC 1400, dashed lined boxes are features on more advanced SoCs. In FIG. 14 an interconnect unit(s) 1402 is coupled to: an application processor 1417 which includes a set of one or more cores 1402A-N and shared cache unit(s) 1406; a system agent unit 1410; a bus controller unit(s) 1416; an integrated memory controller unit(s) 1414; a set of one or more media processors 1420 which can include integrated graphics logic 1408, an image processor 1424 for providing still and/or video camera functionality, an audio processor 1426 for providing hardware audio acceleration, and a video processor 1428 for providing video encode/decode acceleration; a static random access memory (SRAM) unit 1430; a direct memory access (DMA) unit 1432; and a display unit 1440 for coupling to one or more external displays. The embodiments of the pages additions and content copying can be implemented in SoC 1400.

Figure 15:
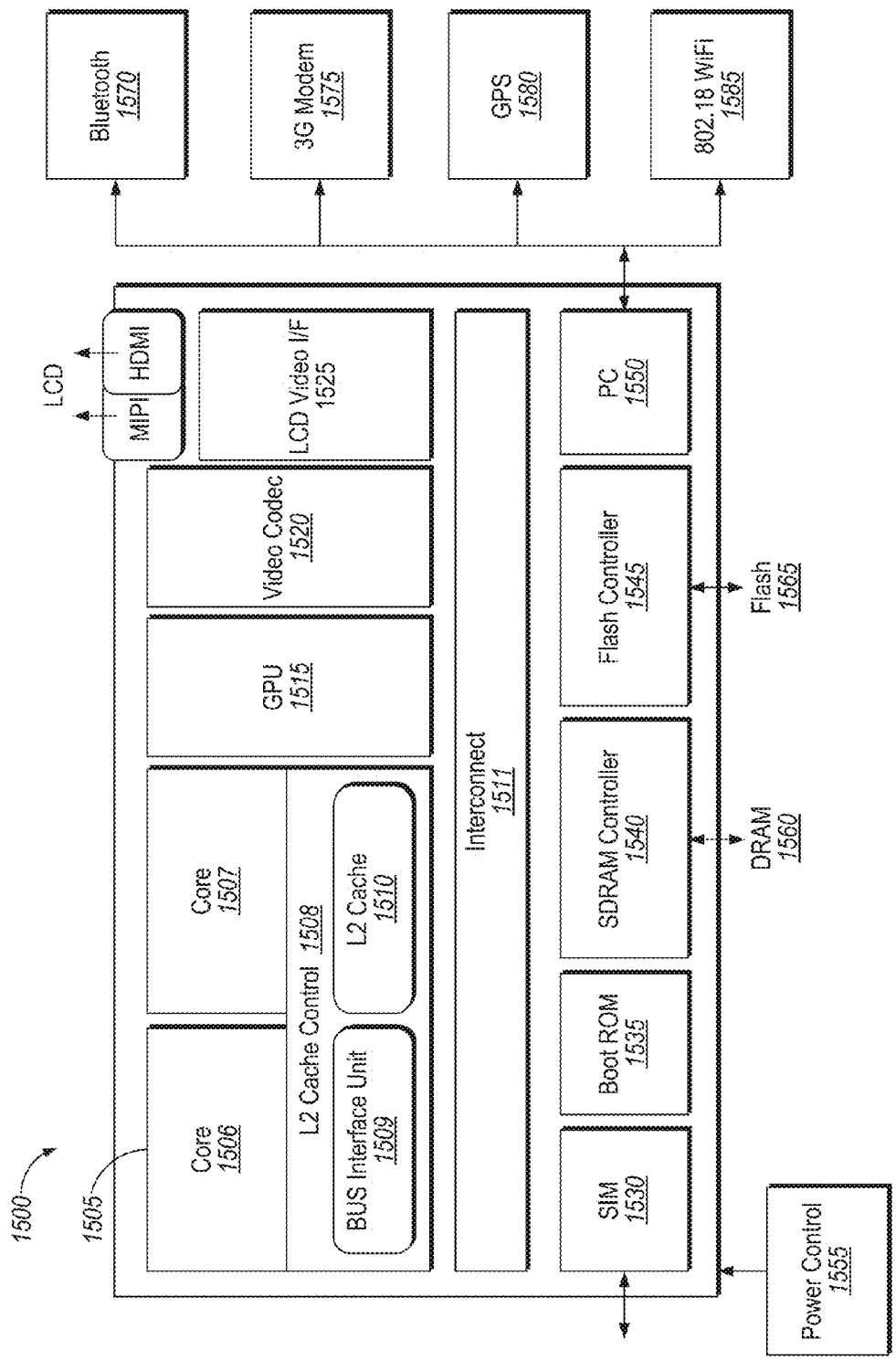
FIG. 15 illustrates another implementation of a block diagram for a computing system.

Turning next to FIG. 15, an embodiment of a system on-chip (SoC) design in accordance with embodiments of the disclosure is depicted. As an illustrative example, SoC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE can connect to a base station or node, which can correspond in nature to a mobile station (MS) in a GSM network. The embodiments of the page additions and content copying can be implemented in SoC 1500.

Here, SoC 1500 includes 2 cores—1506 and 1507. Similar to the discussion above, cores 1506 and 1507 can conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of SOC 1500. Interconnect 1511 includes an on-chip interconnect, such as an IOSF, AMBA, or other interconnects discussed above, which can implement one or more aspects of the described disclosure.

Interconnect 1511 provides communication channels to the other components, such as a Subscriber Identity Module (SIM) 1530 to interface with a SIM card, a boot ROM 1535 to hold boot code for execution by cores 1506 and 1507 to initialize and boot SoC 1500, a SDRAM controller 1540 to interface with external memory (e.g., DRAM 1560), a flash controller 1545 to interface with non-volatile memory (e.g., Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces can incorporate aspects of the embodiments described herein.

In addition, the system illustrates peripherals for communication, such as a Bluetooth module 1570, 3G modem 1575, GPS 1580, and Wi-Fi 1585. Note as stated above, a UE includes a radio for communication. As a result, these peripheral communication modules can not all be included. However, in a UE some form of a radio for external communication should be included.

Figure 16:
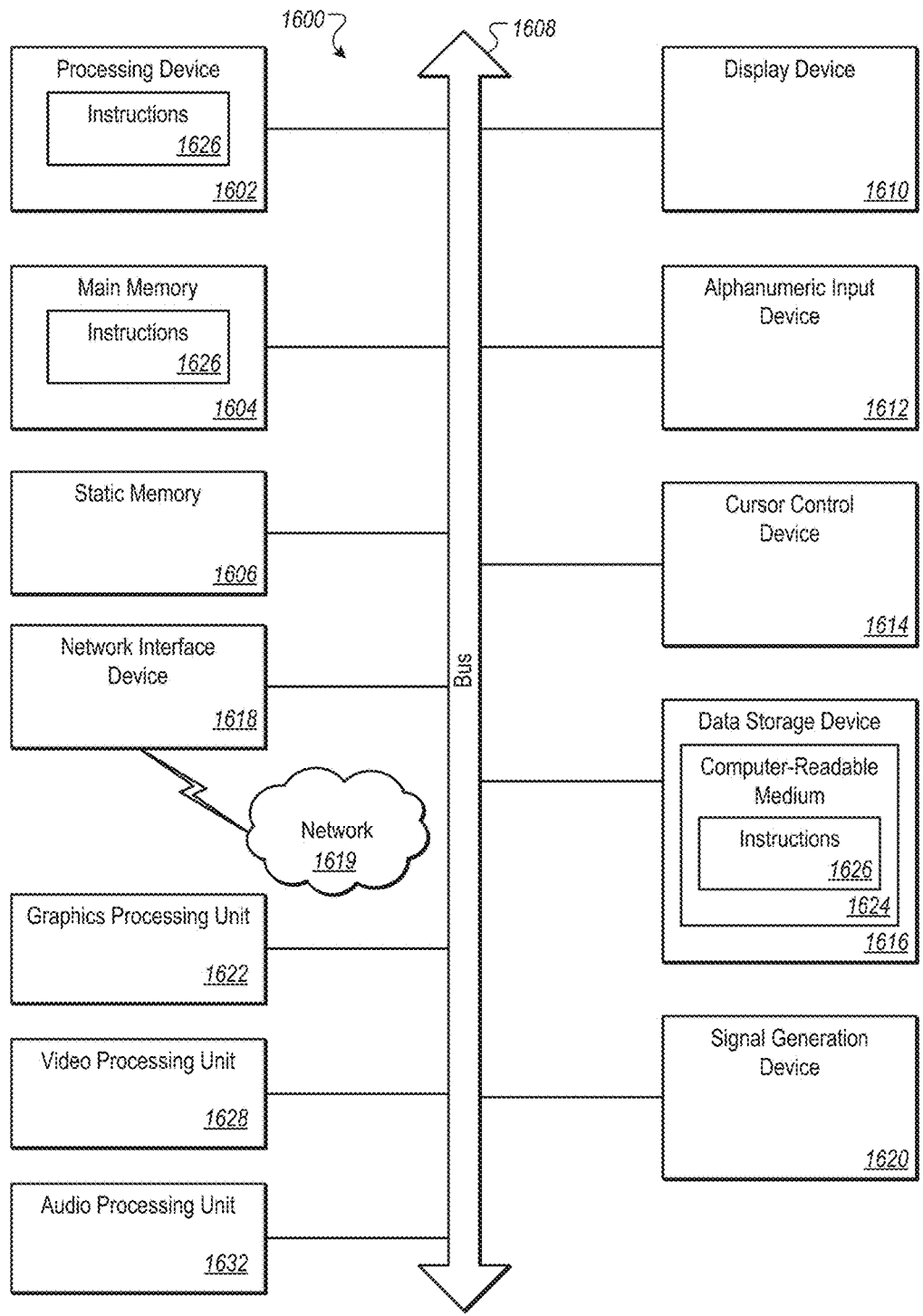
FIG. 16 illustrates another implementation of a block diagram for a computing system.

FIG. 16 illustrates a diagrammatic representation of a machine in the example form of a computing system 1600 within which a set of instructions, for causing the machine to perform any one or more of the methodologies discussed herein, can be executed. In alternative embodiments, the machine can be connected (e.g., networked) to other machines in a LAN, an intranet, an extranet, or the Internet. The machine can operate in the capacity of a server or a client device in a client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments that execute the root complex of FIGS. 2-3 can be implemented in or as a part of the computing system 1600.

The computing system 1600 includes a processing device 1602, main memory 1604 (e.g., flash memory, dynamic random access memory (DRAM) (such as synchronous DRAM (SDRAM) or DRAM (RDRAM), etc.), a static memory 1606 (e.g., flash memory, static random access memory (SRAM), etc.), and a data storage device 1616, which communicate with each other via a bus 1608.

Processing device 1602 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 can also be one or more special-purpose processing devices such as an application specific integrated circuit (ASIC), a field programmable gate array (FPGA), a digital signal processor (DSP), network processor, or the like. In one embodiment, processing device 1602 can include one or processor cores. The processing device 1602 is configured to execute the processing logic or instructions 1626 for performing the operations discussed herein.

In one embodiment, processing device 1602 can be the root complex of FIGS. 2-3. Alternatively, the computing system 1600 can include other components as described herein. It should be understood that the core can support multithreading (executing two or more parallel sets of operations or threads), and can do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1600 can further include a network interface device 1618 communicably coupled to a network 1619. The computing system 1600 also can include a video display device 1610 (e.g., a liquid crystal display (LCD) or a cathode ray tube (CRT)), an alphanumeric input device 1612 (e.g., a keyboard), a cursor control device 1614 (e.g., a mouse), a signal generation device 1620 (e.g., a speaker), or other peripheral devices. Furthermore, computing system 1600 can include a graphics processing unit 1622, a video processing unit 1628 and an audio processing unit 1632. In another embodiment, the computing system 1600 can include a chipset (not illustrated), which refers to a group of integrated circuits, or chips, that are designed to work with the processing device 1602 and controls communications between the processing device 1602 and external devices. For example, the chipset can be a set of chips on a motherboard that links the processing device 1602 to very high-speed devices, such as main memory 1604 and graphic controllers, as well as linking the processing device 1602 to lower-speed peripheral buses of peripherals, such as USB, PCI or ISA buses.

The data storage device 1616 can include a computer-readable storage medium 1624 on which is stored software 1626 embodying any one or more of the methodologies of functions described herein. The software 1626 can also reside, completely or at least partially, within the main memory 1604 as instructions 1626 and/or within the processing device 1602 as processing logic during execution thereof by the computing system 1600; the main memory 1604 and the processing device 1602 also constituting computer-readable storage media.

The computer-readable storage medium 1624 can also be used to store instructions 1626 utilizing the processing device 1602, such as described with respect to FIGS. 1-4, and/or a software library containing methods that call the above applications. While the computer-readable storage medium 1624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an apparatus comprising: 1) an extended capability register and an input/output (I/O) memory management circuitry, the I/O memory management circuitry to: a) receive, from an I/O device, an address translation request referencing a virtual address associated with a guest virtual address space of a virtual machine; b) translate the virtual address to a guest physical address associated with a guest physical address space of the virtual machine; and c) responsive to determining that a value stored by the extended capability register indicates a restrict-translation-request-response (RTRR) mode, transmit, to the I/O device, a translation response comprising the guest physical address.

In Example 2, the apparatus of claim 1, wherein the I/O memory management circuitry is further to, responsive to receipt, from the I/O device, of a translated request including the guest physical address: a) complete translation of the guest physical address to a host physical address using a virtual machine monitor (VMM) mapping between the guest physical address and the host physical address; and b) transmit the host physical address to the I/O device upon successful translation of the guest physical address to the host physical address.

In Example 3, the apparatus of Example 1, wherein the RTRR mode is set in relation to the guest virtual address space or the I/O device, and wherein an extended-context-entry data structure of an extended-root-entry table for second-level translations within the I/O memory management circuitry includes an RTRR field for enabling the RTRR mode of the capability register.

In Example 4, the apparatus of Example 1, wherein the I/O memory management circuitry is further to, responsive to detecting a terminal fault during the translation, include null permissions within the translation response with respect to access rights to a page in memory.

In Example 5, the apparatus of Example 1, wherein the I/O memory management circuitry further includes a second extended capability register, and wherein the I/O memory management circuitry is further to: a) detect successful translation of the virtual address to a host physical address; and b) determine whether the address translation request has a process address space identifier (PASID) responsive to detecting a no-permission-on-translation-request-response (NP-TRSP) mode set within the second extended capability register, wherein the NP-TRSP mode corresponds to a second-level page table entry.

In Example 6, the apparatus of Example 5, wherein, to translate the virtual address to the guest physical address, the I/O memory management circuitry is to perform nested translation within a plurality of levels of a second-level paging structure except for at least a final level of the plurality of levels.

In Example 7, the apparatus of Example 6, wherein the I/O memory management circuitry is further to detect enablement of nested translation for translation requests with a PASID, and wherein the virtual address is a guest virtual address (GVA).

In Example 8, the apparatus of Example 6, wherein the I/O memory management circuitry is further to detect enablement of nested translation for translation requests without a PASID, the virtual address is an I/O virtual address (IOVA), and the guest virtual address space is an I/O virtual address space.

In Example 9, the apparatus of Example 6, wherein the I/O memory management circuitry is further to: a) detect disablement of nested translation for requests without PASID; and b) transmit, in the translation response, a set untranslated access only flag (U) to force an untranslated request without transmitting an address.

In Example 10, the apparatus of Example 6, wherein the I/O memory management circuitry is further to, responsive to receipt, from the I/O device, of a translated request that includes the guest physical address: a) one of complete translation of the guest physical address through the at least a final level of the second-level paging structure to generate a host physical address, or detect a malicious address within the translated request; b) transmit the host physical address to the I/O device upon successful translation of the guest physical address to the host physical address; and c) generate a terminal fault in response to detecting the malicious address.

Various embodiments can have different combinations of the structural features described above. For instance, all optional features of the computing system described above can also be implemented with respect to the method or process described herein and specifics in the examples can be used anywhere in one or more embodiments.

Example 11 is a system comprising: 1) a memory to store pages that are mapped to a guest physical address space of a virtual machine; 2) an input/output (I/O) memory management circuitry operatively coupled to the memory and including an extended capability register, the I/O memory management circuitry to: a) receive, from an I/O device, an address translation request referencing a virtual address associated with a guest virtual address space of a virtual machine; b) translate the guest virtual address to a guest physical address associated with the guest physical address space of the virtual machine; and c) responsive to determining that a value stored by the extended capability register indicates a restrict-translation-request-response (RTRR) mode, transmit, to the I/O device, a translation response comprising the guest physical address.

In Example 12, the system of Example 11, wherein the I/O memory management circuitry is further to, responsive to receipt of a translated request from the I/O device that includes the guest physical address: a) complete translation of the guest physical address to a host physical address using a virtual machine monitor (VMM) mapping between the guest physical address and the host physical address; and b) transmit the host physical address to the I/O device upon successful translation of the guest physical address to the host physical address.

In Example 13, the system of Example 11, wherein the RTRR mode is set in relation to the guest virtual address space or the I/O device, and wherein a process address space identifier (PASID) entry within a PASID table used to translate the guest physical address includes an RTRR field for enabling the RTRR mode of the capability register.

In Example 14, the Example of claim 11, wherein the I/O memory management circuitry is further to, responsive to detecting a terminal fault during the translation, include null permissions within the translation response with respect to access rights to a page in the memory.

In Example 15, the system of Example 11, wherein the I/O memory management circuitry further includes a second extended capability register, and wherein the I/O memory management circuitry is further to: a) detect successful translation of the virtual address to a host physical address; and b) determine whether the address translation request has a process address space identifier (PASID) responsive to detecting a no-permission-on-translation-request-response (NP-TRSP) mode set within the second extended capability register, wherein the NP-TRSP mode corresponds to a second-level page table entry.

In Example 16, the system of claim 15, wherein, to translate the virtual address to the guest physical address, the I/O memory management circuitry is to perform nested translation within a plurality of levels of a second-level paging structure except for at least a final level of the plurality of levels.

In Example 17, the system of Example 16, wherein the I/O memory management circuitry is further to detect enablement of nested translation for translation requests with a PASID, and wherein the virtual address is a guest virtual address (GVA).

In Example 18, the system of Example 16, wherein the I/O memory management circuitry is further to detect enablement of nested translation for translation requests without a PASID, the virtual address is an I/O virtual address (IOVA), and wherein the guest virtual address space is an I/O virtual address space.

In Example 19, the system of Example 16, wherein the I/O memory management circuitry is further to: a) detect disablement of the nested translation for requests without PASID; and b) transmit, in the translation response, a set untranslated access only flag (U) to force an untranslated request without transmitting an address.

In Example 20, the system of Example 16, wherein the I/O memory management circuitry is further to, responsive to receipt, from the I/O device, of a translated request that includes the guest physical address: a) one of complete translation of the guest physical address through the at least a final level of the second-level paging structure to generate a host physical address, or detect a malicious address within the translated request; b) transmit the host physical address to the I/O device upon successful translation of the guest physical address; and c) generate a terminal fault in response to detecting the malicious address.

Various embodiments can have different combinations of the structural features described above. For instance, all optional features of the computing system described above can also be implemented with respect to the method or process described herein and specifics in the examples can be used anywhere in one or more embodiments.

Example 21 is a method comprising: 1) mapping within a second-level paging table of a main memory, by a processing device executing a virtual machine monitor (VMM), a first guest physical address to a first host physical address in response to paging-in a first memory page into the main memory; b) detecting, by the processing device executing the VMM, a demand to page out the first guest physical address from the main memory, wherein the demand is due to an overcommit to the main memory; c) setting, by the processing device executing the VMM, a no-permission-on-translation-request-response (NP-TRSP) field in the second-level paging table containing the mapping, to indicate, to a subsequent translation request, invalidation of cached copies of the first guest physical address; d) requesting, by the processing device executing the VMM, an invalidation of the first guest physical address at an I/O translation lookaside buffer of an I/O memory management circuitry; e) requesting, by the processing device executing the VMM, an invalidation of the first guest physical address at an address translation cache of an I/O device; and f) setting, by the processing device executing the VMM, the mapping between the first guest physical address and the first host physical address in the second-level paging table as not present.

In Example 22, the method of Example 21, further comprising waiting for completion of the invalidations of the first guest physical address at the I/O translation lookaside buffer and the address translation cache before performing the setting.

In Example 23, the method of Example 21, further comprising: 1) receiving, by the I/O memory management circuitry, the subsequent translation request containing the first guest physical address; 2) detecting, by the I/O memory management circuitry, the NP-TRSP field as set in the second-level paging table during translation; and 3) transmitting, by the I/O memory management circuitry in a translation response to the I/O device, null permissions as to access rights to the first memory page responsive to detecting the NP-TRSP field as set.

In Example 24, the method of Example 21, further comprising: 1) detecting the subsequent translation request containing the first guest physical address; 2) demanding a page-in of a second host physical address into the main memory; 3) mapping the first guest physical address to the second host physical address, to generate a second mapping; and 4) resetting the NP-TRSP field to zero in the second-level paging table corresponding to the second mapping.

In Example 25, the method of Example 21, further comprising: 1) requesting an invalidation of the first host physical address at an I/O translation lookaside buffer of the I/O memory management circuitry; 2) requesting an invalidation of the first host physical address at an address translation cache of the I/O device; and 3) after completion of the invalidations of the first host physical address at the I/O translation lookaside buffer and the address translation cache, paging out data from the first memory page.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to compression/decompression optimization in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. An apparatus comprising an extended capability register, a second extended capability register, and an input/output (I/O) memory management circuitry, the I/O memory management circuitry to:
   receive, from an I/O device, an address translation request referencing a virtual address associated with a guest virtual address space of a virtual machine;
   translate the virtual address to a guest physical address associated with a guest physical address space of the virtual machine;
   responsive to determining that a value stored by the extended capability register indicates a restrict-translation-request-response (RTRR) mode, transmit, to the I/O device, a translation response comprising the guest physical address;
   detect successful translation of the virtual address to a host physical address; and
   determine whether the address translation request has a process address space identifier (PASID) responsive to detection of a no-permission-on-translation-request-response (NP-TRSP) mode set within the second extended capability register, wherein the NP-TRSP mode corresponds to a second-level page table entry.

2. The apparatus of claim 1, wherein the I/O memory management circuitry is further to, responsive to receipt, from the I/O device, of a translated request including the guest physical address:
   complete translation of the guest physical address to a host physical address using a virtual machine monitor (VMM) mapping between the guest physical address and the host physical address; and
   transmit the host physical address to the I/O device upon successful translation of the guest physical address to the host physical address.

3. The apparatus of claim 1, wherein the RTRR mode is set in relation to the guest virtual address space or the I/O device, and wherein an extended-context-entry data structure of an extended-root-entry table for second-level translations within the I/O memory management circuitry includes an RTRR field for enabling the RTRR mode of the capability register.

4. The apparatus of claim 1, wherein the I/O memory management circuitry is further to, responsive to detecting a terminal fault during the translation, include null permissions within the translation response with respect to access rights to a page in memory.

5. The apparatus of claim 1, wherein, to translate the virtual address to the guest physical address, the I/O memory management circuitry is to perform nested translation within a plurality of levels of a second-level paging structure except for at least a final level of the plurality of levels.

6. The apparatus of claim 5, wherein the I/O memory management circuitry is further to detect enablement of nested translation for translation requests with a PASID, and wherein the virtual address is a guest virtual address (GVA).

7. The apparatus of claim 5, wherein the I/O memory management circuitry is further to detect enablement of nested translation for translation requests without a PASID, the virtual address is an I/O virtual address (IOVA), and the guest virtual address space is an I/O virtual address space.

8. The apparatus of claim 5, wherein the I/O memory management circuitry is further to:
   detect disablement of nested translation for requests without PASID; and
   transmit, in the translation response, a set untranslated access only flag (U) to force an untranslated request without transmitting an address.

9. The apparatus of claim 5, wherein the I/O memory management circuitry is further to, responsive to receipt, from the I/O device, of a translated request that includes the guest physical address:
   one of complete translation of the guest physical address through the at least a final level of the second-level paging structure to generate a host physical address, or detect a malicious address within the translated request;
   transmit the host physical address to the I/O device upon successful translation of the guest physical address to the host physical address; and
   generate a terminal fault in response to detecting the malicious address.

10. A system comprising:
   a memory to store pages that are mapped to a guest physical address space of a virtual machine;
   an input/output (I/O) memory management circuitry operatively coupled to the memory and including an extended capability register and a second extended capability register, the I/O memory management circuitry to:
      receive, from an I/O device, an address translation request referencing a virtual address associated with a guest virtual address space of a virtual machine;
      translate the guest virtual address to a guest physical address associated with the guest physical address space of the virtual machine; and
      responsive to determining that a value stored by the extended capability register indicates a restrict-translation-request-response (RTRR) mode, transmit, to the I/O device, a translation response comprising the guest physical address;
      detect successful translation of the virtual address to a host physical address; and
      determine whether the address translation request has a process address space identifier (PASID) responsive to detection of a no-permission-on-translation-request-response (NP-TRSP) mode set within the second extended capability register, wherein the NP-TRSP mode corresponds to a second-level page table entry.

11. The system of claim 10, wherein the I/O memory management circuitry is further to, responsive to receipt of a translated request from the I/O device that includes the guest physical address:
   complete translation of the guest physical address to a host physical address using a virtual machine monitor (VMM) mapping between the guest physical address and the host physical address; and
   transmit the host physical address to the I/O device upon successful translation of the guest physical address to the host physical address.

12. The system of claim 10, wherein the RTRR mode is set in relation to the guest virtual address space or the I/O device, and wherein a process address space identifier (PASID) entry within a PASID table used to translate the guest physical address includes an RTRR field for enabling the RTRR mode of the capability register.

13. The system of claim 10, wherein the I/O memory management circuitry is further to, responsive to detecting a terminal fault during the translation, include null permissions within the translation response with respect to access rights to a page in the memory.

14. The system of claim 10, wherein, to translate the virtual address to the guest physical address, the I/O memory management circuitry is to perform nested translation within a plurality of levels of a second-level paging structure except for at least a final level of the plurality of levels.

15. The system of claim 14, wherein the I/O memory management circuitry is further to detect enablement of nested translation for translation requests with a PASID, and wherein the virtual address is a guest virtual address (GVA).

16. The system of claim 14, wherein the I/O memory management circuitry is further to detect enablement of nested translation for translation requests without a PASID, the virtual address is an I/O virtual address (IOVA), and wherein the guest virtual address space is an I/O virtual address space.

17. The system of claim 14, wherein the I/O memory management circuitry is further to:
   detect disablement of the nested translation for requests without PASID; and
   transmit, in the translation response, a set untranslated access only flag (U) to force an untranslated request without transmitting an address.

18. The system of claim 14, wherein the I/O memory management circuitry is further to, responsive to receipt, from the I/O device, of a translated request that includes the guest physical address:
- one of complete translation of the guest physical address through the at least a final level of the second-level paging structure to generate a host physical address, or detect a malicious address within the translated request;
- transmit the host physical address to the I/O device upon successful translation of the guest physical address; and
- generate a terminal fault in response to detecting the malicious address.

19. A method comprising:
- mapping within a second-level paging table of a main memory, by a processing device executing a virtual machine monitor (VMM), a first guest physical address to a first host physical address in response to paging-in a first memory page into the main memory;
- detecting, by the processing device executing the VMM, a demand to page out the first guest physical address from the main memory, wherein the demand is due to an overcommit to the main memory;
- setting, by the processing device executing the VMM, a no-permission-on-translation-request-response (NP-TRSP) field in the second-level paging table containing the mapping, to indicate, to a subsequent translation request, invalidation of cached copies of the first guest physical address;
- requesting, by the processing device executing the VMM, an invalidation of the first guest physical address at an I/O translation lookaside buffer of an I/O memory management circuitry;
- requesting, by the processing device executing the VMM, an invalidation of the first guest physical address at an address translation cache of an I/O device; and
- setting, by the processing device executing the VMM, the mapping between the first guest physical address and the first host physical address in the second-level paging table as not present.

20. The method of claim 19, further comprising waiting for completion of the invalidations of the first guest physical address at the I/O translation lookaside buffer and the address translation cache before performing the setting.

21. The method of claim 19, further comprising:
- receiving, by the I/O memory management circuitry, the subsequent translation request containing the first guest physical address;
- detecting, by the I/O memory management circuitry, the NP-TRSP field as set in the second-level paging table during translation; and
- transmitting, by the I/O memory management circuitry in a translation response to the I/O device, null permissions as to access rights to the first memory page responsive to detecting the NP-TRSP field as set.

22. The method of claim 19, further comprising:
- detecting the subsequent translation request containing the first guest physical address;
- demanding a page-in of a second host physical address into the main memory;
- mapping the first guest physical address to the second host physical address, to generate a second mapping; and
- resetting the NP-TRSP field to zero in the second-level paging table corresponding to the second mapping.

23. The method of claim 19, further comprising:
- requesting an invalidation of the first host physical address at an I/O translation lookaside buffer of the I/O memory management circuitry;
- requesting an invalidation of the first host physical address at an address translation cache of the I/O device; and
- after completion of the invalidations of the first host physical address at the I/O translation lookaside buffer and the address translation cache, paging out data from the first memory page.

* * * * *